(12) United States Patent
Stoianovici et al.

(10) Patent No.: US 7,051,610 B2
(45) Date of Patent: May 30, 2006

(54) BALL-WORM TRANSMISSION

(75) Inventors: Dan Stoianovici, Baltimore, MD (US); Louis Kavoussi, Baltimore, MD (US)

(73) Assignee: Douglas Holtz, Riverdale, NY (US), part interest ( * ) Notice: Subject to any disclaimer, the term of this patent is extended or adjusted under 35 U.S.C. 154(b) by 237 days.

(21) Appl. No.: 10/271,604

(22) Filed: Oct. 16, 2002

(65) Prior Publication Data

US 2003/0115981 A1  Jun. 26, 2003

Related U.S. Application Data

(60) Provisional application No. 60/339,247, filed on Nov. 13, 2001.

(51) Int. Cl.
*F16H 27/02* (2006.01)
*F16H 1/16* (2006.01)
*F16H 1/20* (2006.01)
*F16C 29/06* (2006.01)

(52) U.S. Cl. .................... 74/425; 74/89.14; 74/424.85; 74/458; 384/45

(58) Field of Classification Search .............. 74/425, 74/89.14, 424.85, 458, 459.5, 460, 461, 462, 74/463, 464, 468; 384/45
See application file for complete search history.

(56) References Cited

U.S. PATENT DOCUMENTS

| | | | | |
|---|---|---|---|---|
| 618,272 A * | 1/1899 | Johnson | ...................... | 74/462 |
| 1,356,444 A * | 10/1920 | Golden | ...................... | 384/462 |
| 2,142,477 A * | 1/1939 | Murden | ...................... | 384/516 |
| 3,188,877 A | 6/1965 | Schmidt | | |
| 3,190,138 A | 6/1965 | MacChesney | | |
| 3,365,974 A | 1/1968 | Lieberman | | |
| 3,377,879 A | 4/1968 | Shiwaku | | |
| 3,468,179 A | 9/1969 | Sedgwick et al. | | |
| 3,489,026 A | 1/1970 | Bond | | |
| 3,494,215 A | 2/1970 | Fengler | | |
| 3,586,396 A * | 6/1971 | Barr et al. | ..................... | 384/49 |
| 3,672,239 A | 6/1972 | Titt | | |
| 4,006,646 A | 2/1977 | F'Geppert | | |
| 4,023,433 A | 5/1977 | Schutz | | |
| 4,047,449 A * | 9/1977 | Popov | ......................... | 74/458 |
| 4,524,643 A * | 6/1985 | Ziegler et al. | .............. | 475/345 |
| 4,951,519 A | 8/1990 | Ohtsuka | | |
| 5,090,266 A | 2/1992 | Otsuka | | |
| 5,237,886 A | 8/1993 | Kellar | | |
| 5,373,753 A | 12/1994 | Toyomasa | | |
| 5,655,410 A | 8/1997 | Nakamaura | | |
| 5,816,103 A | 10/1998 | Huang | | |
| 6,513,977 B1 * | 2/2003 | Kasuga et al. | ................ | 384/43 |
| 6,676,295 B1 * | 1/2004 | Kasuga et al. | ................ | 384/45 |

* cited by examiner

*Primary Examiner*—Richard W. Ridley
*Assistant Examiner*—Colby Hansen
(74) *Attorney, Agent, or Firm*—Frishauf, Holtz, Goodman & Chick, P.C.

(57) ABSTRACT

A ball-worm transmission is provided which replaces the sliding friction of the classic worm mechanism with the rolling friction of spherical balls. The ball-worm transmission assembly includes a worm which defines a recirculation path, and a gear coupled to the worm via a plurality of spherical balls. The gear includes a plurality of teeth each having a thickness in a central plane of the gear and a lesser thickness towards both sides of the gear, so that a gap is defined between the teeth is larger towards both sides of the gear than in the central plane of the gear.

19 Claims, 25 Drawing Sheets

Prior Art

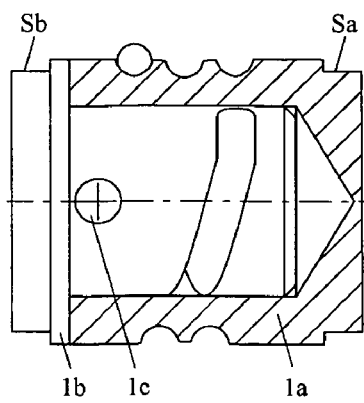
Fig. 8A
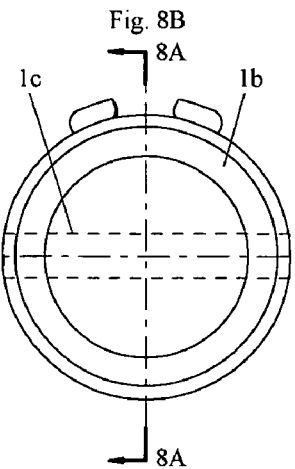
Fig. 8B
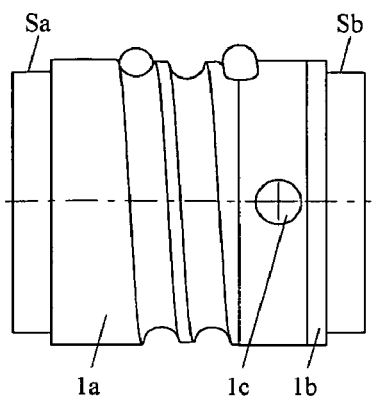
Fig. 8C
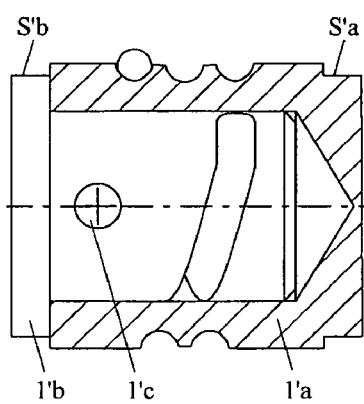
Fig. 8'A
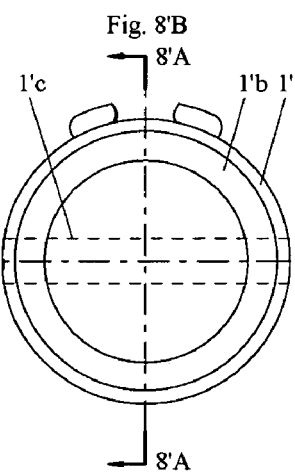
Fig. 8'B
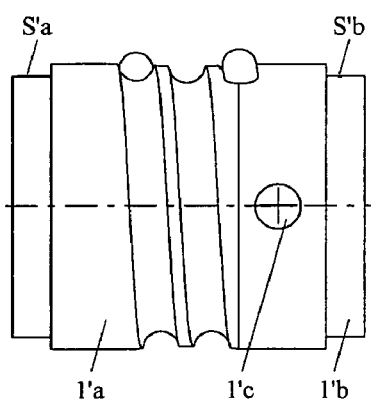
Fig. 8'C
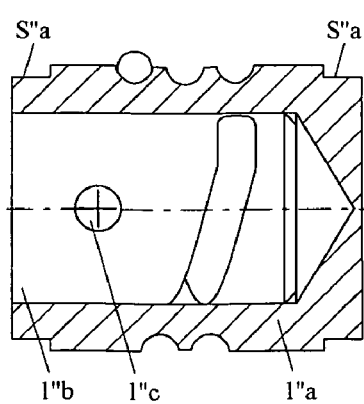
Fig. 8"A
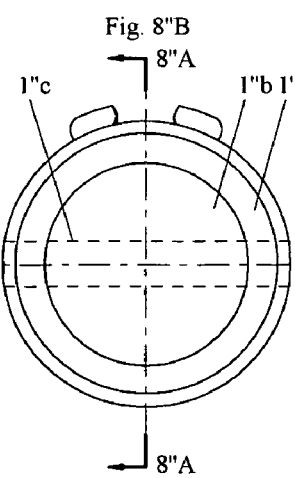
Fig. 8"B
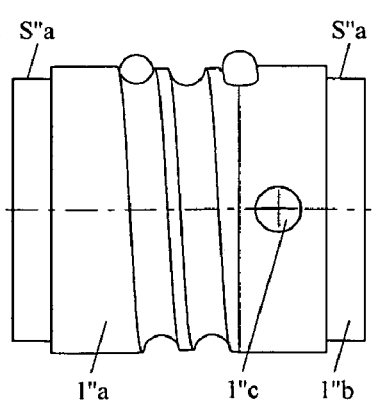
Fig. 8"C Fig. 19A
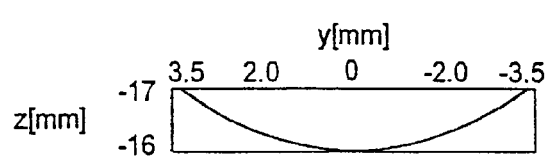
Fig. 19B
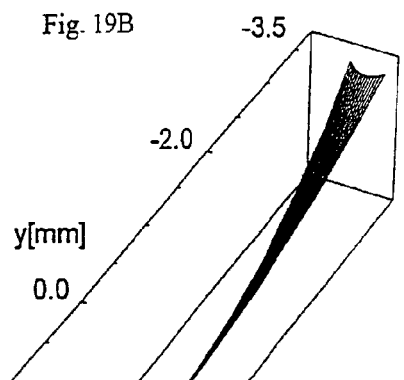
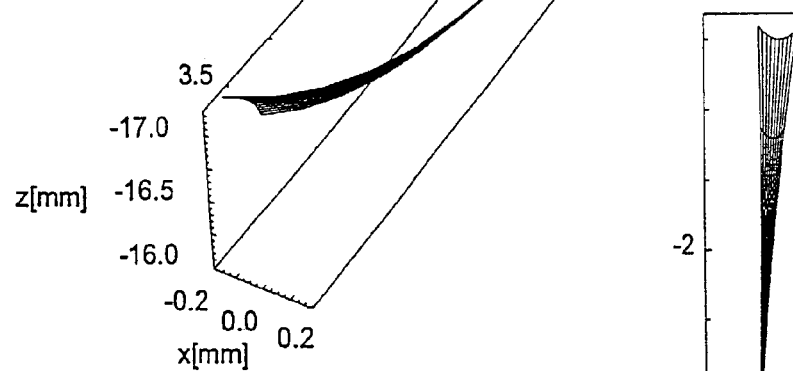
Fig. 19D
Fig. 19C
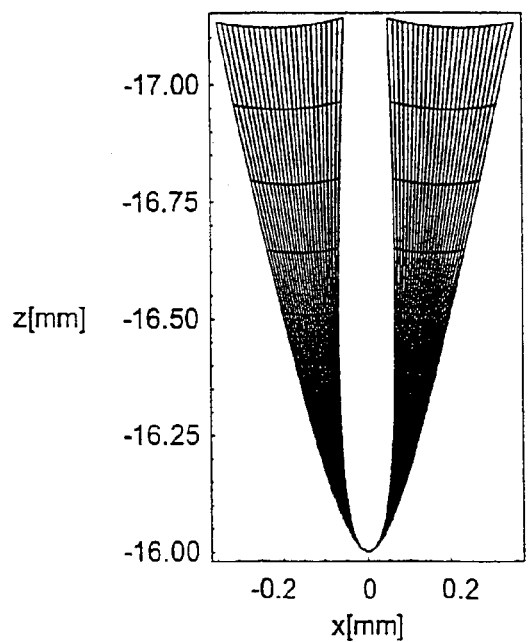
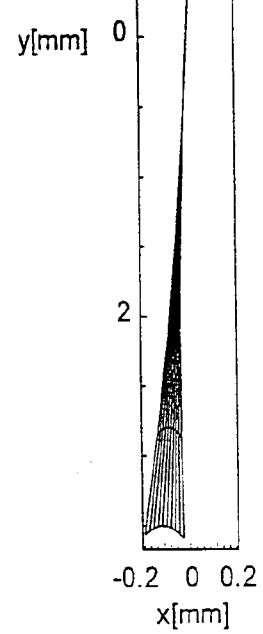

BALL-WORM TRANSMISSION

This application claims the benefit of U.S. Provisional Application No. 60/339,247 filed Nov. 13, 2001, the entire contents of which are incorporated herein by reference.

BACKGROUND OF THE INVENTION

The present invention relates to a ball worm transmission for transmission of rotational motion between two shafts with nonintersecting axes using rolling elements. It represents a combination of two mechanical principles: the worm transmission and the rolling of spherical balls. The functionality is somewhat similar to a ball-screw mechanism; however it provides a rotational rather than translational output.

The invention resulted from the need for a miniature, kinematically precise, highly efficient rotational transmission with high transmission ratio capable of transmitting relatively high power with no backlash. Such mechanisms are required for actuating revolute joints of precision mechanisms such as small robot manipulators.

Several solutions for creating non-backlash rotational-rotational transmissions (R—R) using gears have been proposed, such as the split gear, the variable pitch (duplex) or conical shaped worm. Each particular approach either presents limited non-backlash torque ranges or is too complex to be miniaturized. Moreover, these solutions present reduced power transmission efficiency (typically on the order of 30%).

For rotational-translational (R-T) transmissions, high kinematic precision and efficiency have been successfully implemented based on the ball-screw mechanism. Ball-screws are readily available on a large variety of sizes and they are widely used for precise mechanisms. The ball-screw mechanism represents a variation of the regular screw mechanism by introducing a number of spherical balls between the screw and the nut and providing a recirculation path for the balls. The screw and the nut are no longer in contact and the motion is transmitted through the balls rolling in between. The key feature that provided the success of this mechanism was the replacement of the sliding friction between the screw and the nut by the rolling friction of spherical balls complemented by a smooth recirculation path implemented into the nut.

The worm transmission was the perfect candidate for implementing the rotational transmission under the required characteristics. It is non-backdrivable and it is relatively simple, thus allowing miniaturization. Its only problem is that it may not be constructed without backlash and it is power inefficient. The classic worm transmission is schematically represented in FIGS. 1A and 1B.

As shown in FIG. 1A, the classic worm transmission has two main components: the worm 100 and the gear 200. For clarity, the bearings and the casing that typically support these components are not represented in the schematic. The distance between their axes is specified by aD. In the non-backdrivable configuration (small worm pitch) the input is the rotational motion of the worm ($\alpha$) and the output is the rotation of the worm gear ($\gamma$). When the worm turns, its spiral shaped teeth tangentially slide on the gear teeth, like a continuous wedge. The contact region shifts axially thus engaging the teeth of the gear and rotating it.

During motion there is a continuous sliding of surfaces on the worm and gear teeth. For this, the transmission requires sustained lubrication as well as the use of dissimilar (friction-paired) materials for gear and shaft that are paired for minimal friction and reduced wear.

FIG. 1B shows a normal view of the worm and gear teeth at the region of contact. The cross section of the worm tooth is trapezoidal while the gear is involute. Depending on the distance between the axes of the worm and gear (aD) there is either clearance or interference between the teeth. Ideally the distance aD would be set so that this gap was zero. In practice this perfect condition is impossible to achieve due to misalignment and manufacturing errors. Moreover, this is impossible to maintain due to the wear of the surfaces under sliding friction. Therefore, in case a clearance is present, the transmission presents backlash, the worm gear plays. If interference is present, the friction forces are highly increased and the transmission is either blocked or very inefficient creating premature wearing. Furthermore, it is common that the worm and the gear are not perfectly mounted on their shafts so that they are eccentric. This causes the gear to present variable clearance or interference at different angular positions, consequently the transmission does not exhibit uniform performance, is kinematically inconsistent, and imprecise.

Thus, although the classic worm transmission is simple, non-backdrivable, and may be miniaturized, its sliding friction causes reduced efficiency and kinematic inconsistency. In the case of the screw mechanism, a similar problem has been resolved by creating a ball-screw mechanism that uses spherical balls to replace the sliding friction by rolling friction, thus rendering a highly efficient non-backlash mechanism. In the present invention the ball rolling principle is implemented on a worm mechanism, hence creating the ball-worm transmission.

SUMMARY OF THE INVENTION

The geometry of the worm and gear of the classic worm transmission has been modified to render the transmission of motion through a finite number of spherical balls that cyclically roll between them. To accomplish this, the gear and the worm are constructed with mathematically accurate tooth geometries defined for optimized kinematics.

According to the structure of the present invention, the worm geometry is hyperboloidal for obtaining superior performance by simultaneous engagement of multiple gear teeth. The invention also augments a number of balls and includes a ball recirculation path.

With these modifications the worm and the gear are no longer in contact, yet, at any instance of time they both contact several balls. The rotation of the worm causes the balls between the worm and the gear to roll, thus causing the gear to follow the worm rotation, with a given transmission ratio. Rolling out of the common contact zone between the worm and gear, balls are being recycled on a special circulation path enclosed within the worm. The recirculation path has been designed to provide smooth recirculation while allowing simple manufacturing by constructing the worm of two concentric components.

The classic worm transmission uses the sliding friction between the worm and the gear to implement rotational transfer. The present invention replaces the sliding friction of the classic worm mechanism with the rolling friction of spherical balls. Several major advantages result from the friction reduction: minimal backlash, kinematic precision, high efficiency, increased power transmission capability, minimal lubrication requirement, and the possibility to be designed in backdrive or non-backdrive configurations. The ball worm transmission of the present invention, moreover, may implement high transmission ratios in a manner similar to the classic worm transmission, and the design of the ball worm transmission of the present invention also allows for the miniaturization of the transmission assembly.

BRIEF DESCRIPTION OF THE DRAWINGS

FIGS. 8A, 8B and 8C, 8'A, 8'B, and 8'C, and 8"A, 8"B and 8"C show three respective bearing support versions of the worm assembly.

FIGS. 19A, 19B, 19C and 19D show the gear geometry defined by the tooth gap at the center of the rolling elements.

DETAILED DESCRIPTION

Figure 1A:
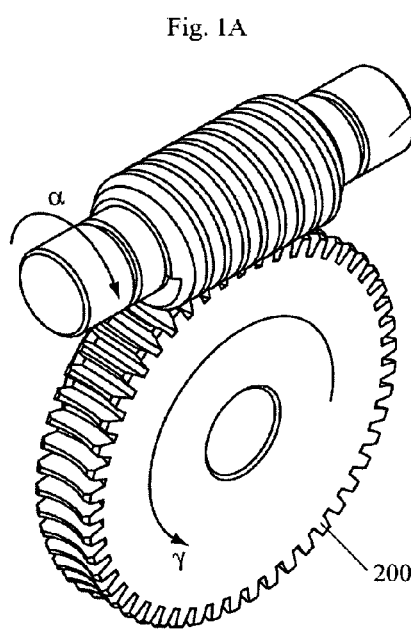
FIGS. 1A and 1B show a schematic of the classic worm transmission.
Figure 1B:
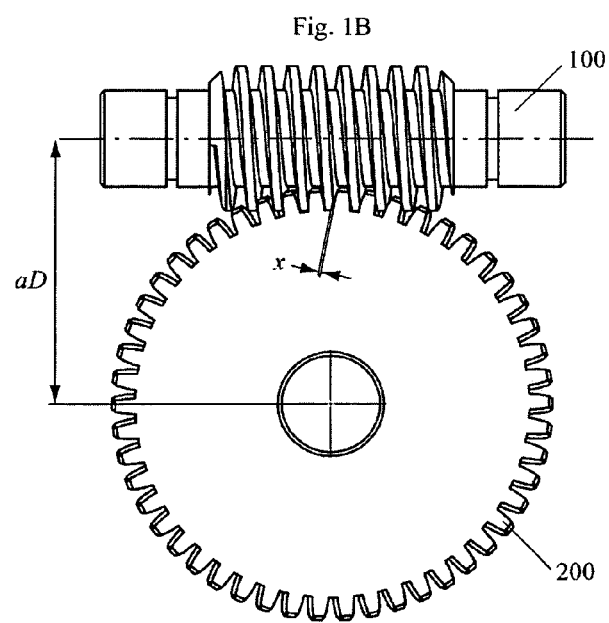
Figure 2A:
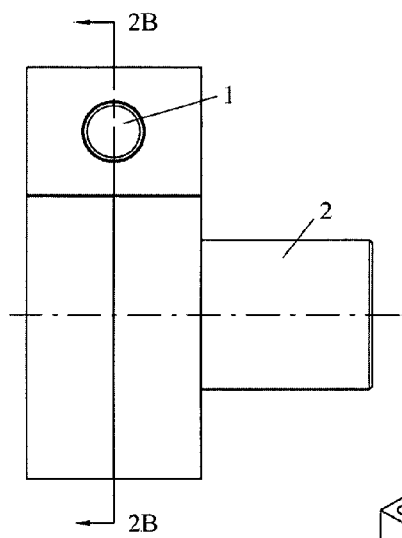
FIG. 2 shows a schematic of the ball-worm transmission assembly of the present invention.
Figure 2B:
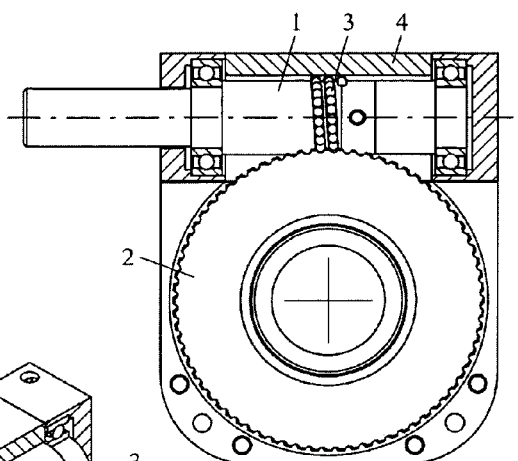
Figure 2C:
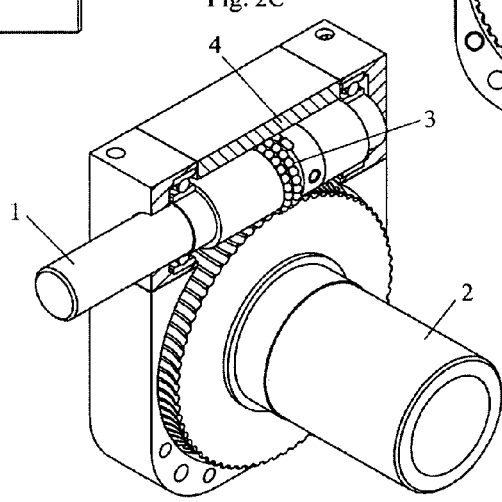

A schematic of the ball-worm transmission assembly is shown in FIG. 2. The transmission comprises a worm 1, a gear 2, a finite number of spherical balls 3, and casing assembly or ball race 4 including some bearings of the shafts. The ball recirculation mechanism is implemented into the worm 1, which is constructed of two concentric parts that are fixed one to another. The balls are recycled through the inner part of the worm.

Figure 3A:
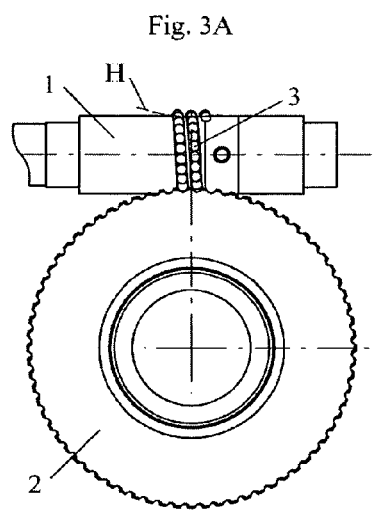
FIGS. 3A, 3B and 3C show isometric close-up, worm-axial, and gear-frontal views, respectively.
Figure 3B:
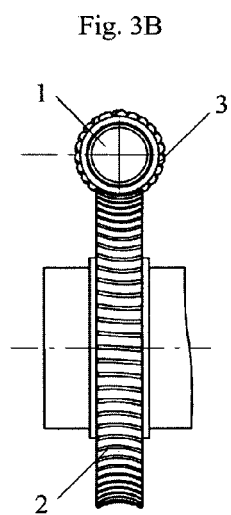
Figure 3C:
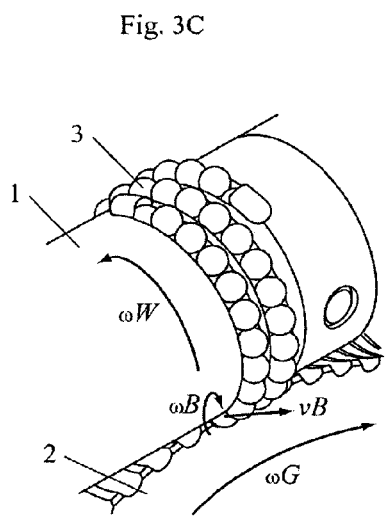

As shown in FIGS. 3A, 3B and 3C, the worm 1 and the gear 2 are not in direct contact. The motion transfer is realized through the balls 3 that roll between them. The worm helix and the gear teeth present a special geometry of double-circular undercut profile (see FIG. 21).

Figure 4A:
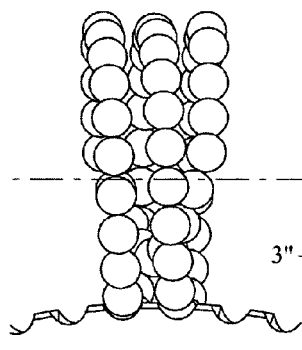
FIGS. 4A, 4B and 4C show active, passive, and recirculation balls on the circulation path.
Figure 4B:
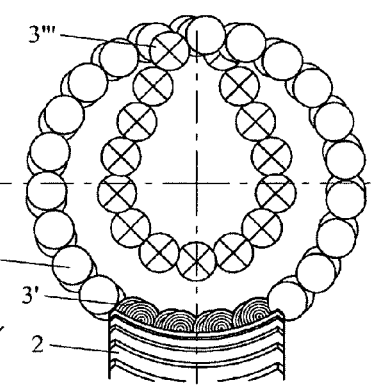
Figure 4C:
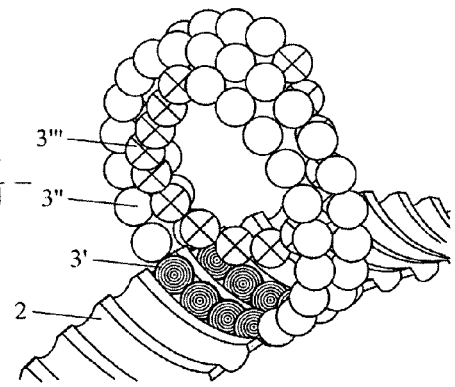

A recirculation path is implemented on the worm assembly. Several balls are in contact between the worm and the gear at any position of the mechanism. A detail of the ball path is shown in FIGS. 4A, 4B and 4C. For clarity, in this schematic the worm has been hidden. The balls 3' in common contact between the worm 1 and the gear 2 are on the active path of the transmission. The remaining balls 3" on the helical worm tooth are on the passive path, while the balls 3''' that are recycled are on the recirculation path. The active path is a part of the worm helix that is momentarily engaged, the passive path is the part of the helix that is not active, and the recirculation path is a separate path created inside the worm. The active, passive, and recirculation function of the balls change dynamically such that during motion a ball passes through all stages and in cycles given by the worm rotation.

Referring to FIGS. 3A and 3C, one may observe that the geometry of the worm helix is hyperboloidal H. This insures that several (particularly two teeth in FIG. 3C) consecutive teeth 5 of the gear are in contact with the balls at any position of the mechanism. The active path spans over several gear teeth. Moreover, there are several active balls per each gear tooth (for example, four balls as shown in FIGS. 4A, 4B and 4C). The increased number of balls in the active region proportionally increases the power capability of the mechanism, improves stiffness, and reduces backlash.

As shown in FIG. 3A, when the worm 1 turns ($\omega_W$) its hyperboloidal-helix teeth engage the active balls, the balls momentarily present between the worm and the gear, thus causing them to roll ($\omega_B$). Rolling causes the active balls to exit the active region ($v_B$) while forcing the remaining balls on the passive path, the recirculation path, and then back into the active zone. In this process the active region shifts axially. The active balls engage the teeth of the gear and rotate it ($\omega_G$). During motion there is a continuous rolling of balls between the worm and the gear teeth. The transmission is based on the rolling of balls between the worm and gear.

Figure 5A:
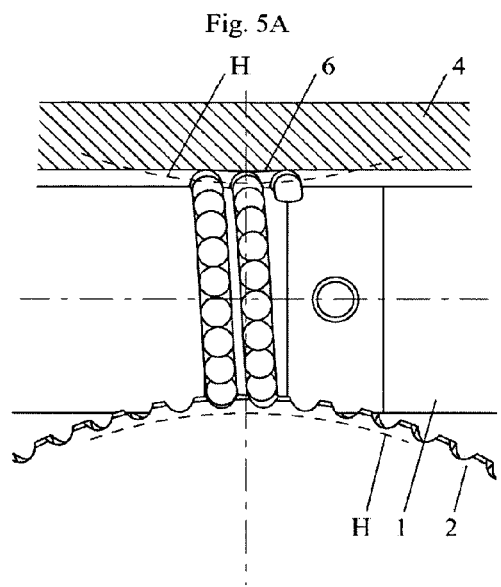
FIGS. 5A and 5B show the ball race for supporting the balls on the passive path.
Figure 5B:
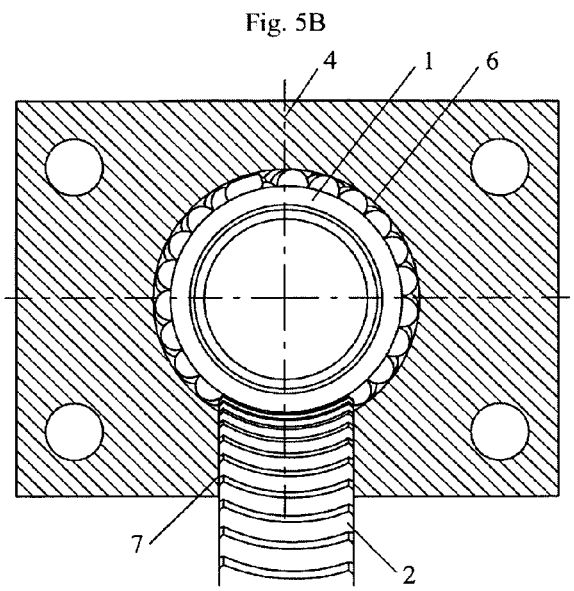

Thus, the ball path comprises three regions: the active, passive, and recirculation. Balls cyclically roll on these paths, during motion a ball passing through all three stages. On the active path the balls roll between the worm and gear thus being fully constrained and supported. Rolling out of the active region into the passive path, the balls are supported on one side by the worm helix. However, on the other side they are unsupported. An outer race 4 is used to further constrain the balls on the passive path, as shown in FIGS. 5A, 5B and 5C.

As shown in the drawings, the ball race 4 is incorporated into the casing of the worm assembly. However, it can also be constructed as a separate part. The ball race 4 presents an internal revolute surface 6 used to maintain the balls 3 on the helix of the worm 1. At the side of the gear 2, the ball race 4 presents a longitudinal cut 7 that is slightly wider than the gear (see FIGS. 5A and 5B). The worm geometry is hyperboloidal H. For maintaining the contact of the balls 3 with both the worm 1 and the ball race 4 at any point on the helix the internal surface 6 of the race should also be hyperboloidal H. If the curvature is small, however, the race could be constructed of cylindrical shape. This simplification applies only if the active path spans over a small (1 or 2) number of gear teeth and the gear diameter is relatively large.

For uniform performance of the transmission it is necessary to insure that the number of active balls is constant or relatively constant at any position of the mechanism. This is generally insured by the construction of the worm, with one exception, which appears when the end of the helical tooth faces the gear.

Figure 6A:
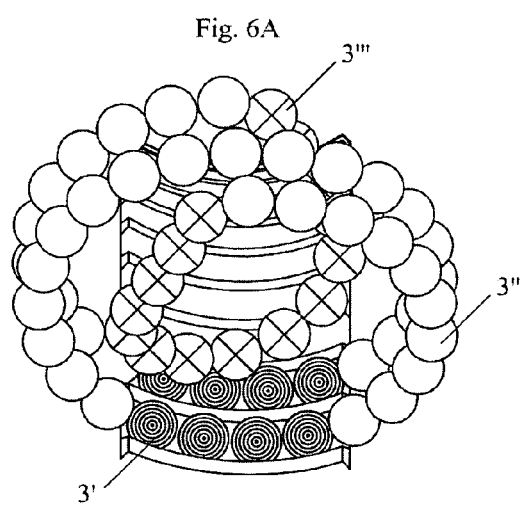
FIGS. 6A and 6B show active, passive and recirculation balls at two opposite worm angles.
Figure 6B:
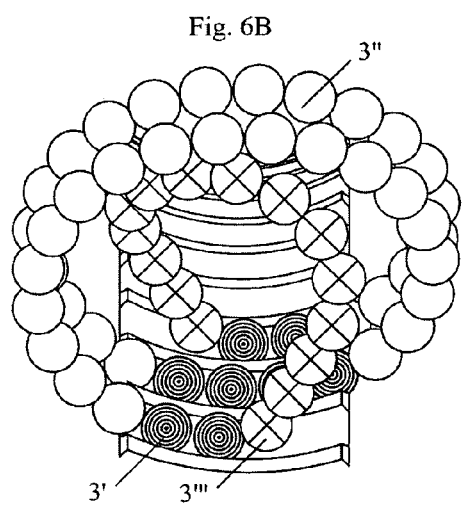
Figure 7A:
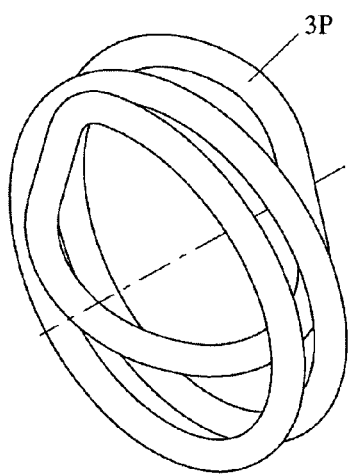
FIGS. 7A, 7B and 7C show the ball circulation envelope in three different views (for $n_T=2$).
Figure 7B:
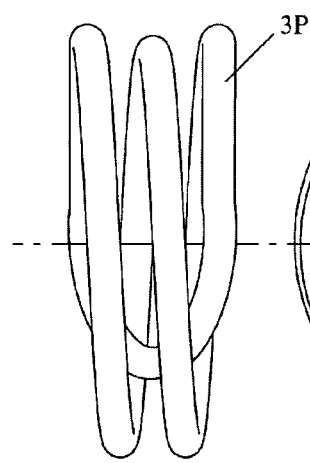
Figure 7C:
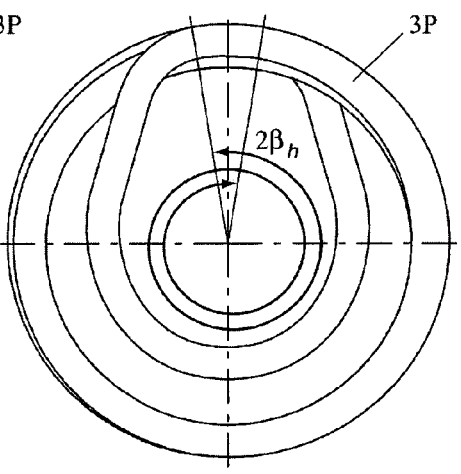

FIGS. 6A and 6B present the active 3', passive 3'', and recirculation 3''' balls for two positions of the worm 1. For clarity in this schematic the worm has been hidden. FIG. 6A presents the common situation when the end of helix does not point towards the gear and the balls exiting the active path enter the passive region. It can be observed that there are always eight (in the case presented) active balls 3', four balls per each tooth. FIG. 6B presents the particular position in which the ends of the helical path (and the recirculation ports) point towards the gear. The active balls directly enter the recirculation path without passing the passive region. In this orientation the total number of active balls 3' is eight as well, but the balls are differently distributed on the worm spiral. The eight active balls 3' are distributed 2-4-2 over three consecutive gear teeth. The constant number of active balls has been achieved by extending the worm helix at each of its ends. The total angle of the worm helix $2\beta_h$ (Equation 16) is distributed symmetrically with respect to the worm center, as presented in FIGS. 7A, 7B and 7C showing the ball circulation envelope.

At the end of the worm helical tooth, after passing either the active or passive path, the balls are recycled on the recirculation path. This path is constructed within the worm. During motion the end of the helix, thus the point where the balls enter the recirculation path, is mobile with respect to any component of the transmission except for the worm itself. For this reason, constructing the recirculation path within the worm is the only viable solution allowing for simplicity and miniaturization.

One significant novel feature of the present invention is the implementation of a worm having a peg part and a worm part and at least one recirculation port built into the worm part that makes possible a miniature construction.

FIGS. 8, 8', and 8'' (each of these with three projection views: section A, longitudinal B, and frontal C) present three different ways of creating the bearing support of the worm rendering three different architectures of the worm assembly. In any case, the worm assembly comprises a worm part (1a, 1'a, 1''a), a peg (1b, 1'b, 1''b), and a dowel pin (1c, 1'c, 1''c). The peg (1b, 1'b, 1''b) is press-fitted into the hole of the worm part (1a, 1'a, 1''a) and it is further constrained by the dowel pin (1c, 1'c, 1''c) setting the relative orientation of the two parts. Both the worm part and the peg implement the recirculation path.

In the first bearing arrangement, FIG. 8, the bearing supports Sa and Sb are respectively created on the worm 1a and peg 1b. The second arrangement presented in FIG. 8' is very much similar in that the supports S'a and S'b are also respectively created on the worm 1'a and peg 1'b. However, in this arrangement, the bearing S'b is also laterally supported on the worm 1'a. As shown in FIG. 8'', the peg 1''b may be entirely positioned within the worm part 1''a so as to ensure perfect coaxiallity of the worm with respect to the shaft support axes (i.e., bearings) on which the worm is mounted in the ball-worm transmission. This is realized by creating both bearing supports S''a and S''a on the worm part 1''a.

Figure 9A:
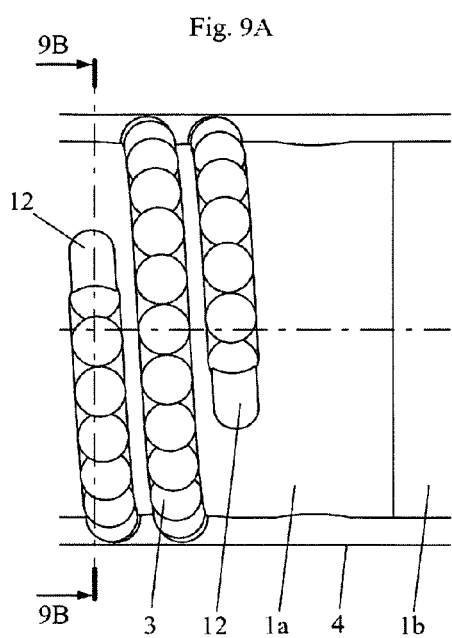
FIGS. 9A and 9B show a recirculation port and the entry into the recirculation path.
Figure 9B:
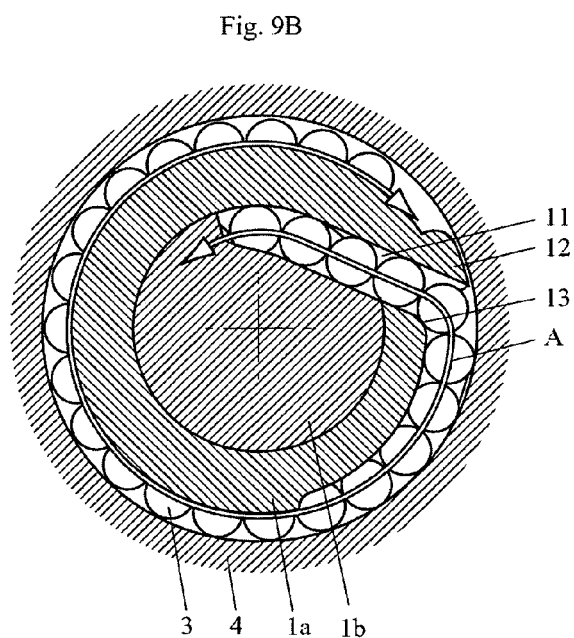

Balls enter and exit the recirculation path at the ends of the helical tooth of the worm. A frontal view of the worm assembly and a cross section taken at one end of the helix detailing the entry/exit of the recirculation path is shown in FIGS. 9A and 9B. Both ends are similarly constructed. This schematic presents the worm part 1a, the peg 1b, the ball race 4, and the transmission balls 3. The balls circulate on the path of the arrow A.

The end point of the helix is connected to a cylindrical oblique hole 11 made in the worm part 1a and part of the peg 1b. The size of the hole is slightly larger than the balls to facilitate circulation. The hole starts at the end of the worm helix, is internally tangent to the outer surface of the peg 1b, and ends at this tangency point. The axis of the hole is in a plane of the section 9B—9B, which is normal on the worm axis passing through the end of the worm helix.

A recirculation port is used to facilitate the transition of balls from the worm helix (active path) to the peg helix (recirculation path). The recirculation port comprises the path deflection boss 12 and the fillet 13. The boss 12 forces the balls to enter the hole 11 by providing a stopper above the ball center on the helical path. This stops the balls on their helical trajectory and forces them to enter the recirculation path. For miniaturization purposes the recirculation port has been constructed into the worm part 1a. However, if space allows it, the port may be constructed as a separate component assembled to the worm (i.e., as a dowel pin, a ring on the circumference of the worm, or a specially designed component). In the illustrated embodiment, the path deflection fillet 13 is a small radius fillet that smoothens the transition from the end of the helical tooth to the straight hole 11.

Figure 10A:
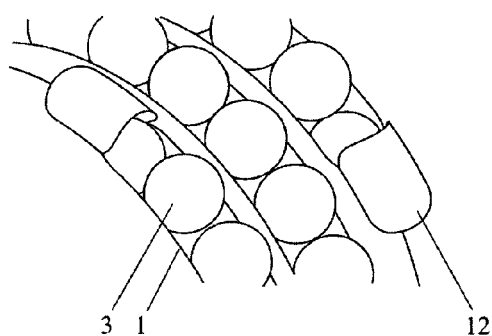
FIGS. 10A and 10B shows a detail of the path deflection boss of the recirculation port
Figure 10B:
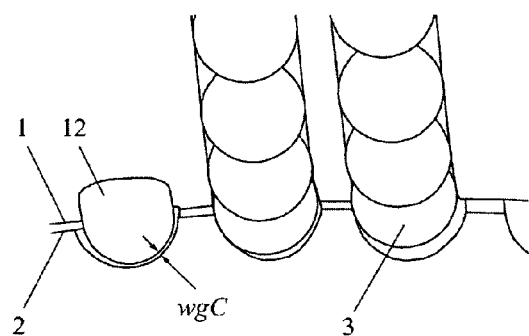

The deflection boss 12 has a special construction. This is necessary in order to avoid interference with both the ball race 4 and the gear 2 during the rotation of the worm. FIG. 10A presents a close-up view of the path deflection boss 12. The boss presents a circular cross section of a slightly smaller radius than the balls 3. This is swept along the helix of the worm 1. The helical direction of the boss may be observed easier in the frontal view of FIG. 9A, showing the way that the boss extends in the continuation of the helix. This geometry creates a clearance between the boss 12 and the outer race 4 as well as a clearance between the boss 12 and the gear 2 during motion. FIG. 10B is a close-up view of the worm 1 and gear 2 when the recirculation port faces the gear. During rotation, the boss 12 passes along the tooth of the gear 2 without interference.

The entry hole of the recirculation path further continues into a helical path that connects the opposite ports. This recirculation helix has a constant radius and, in the proffered embodiment, spans for less than one turn. A corner-free profile is implemented at the transition between the cylindrical and helical parts.

Figure 11A:
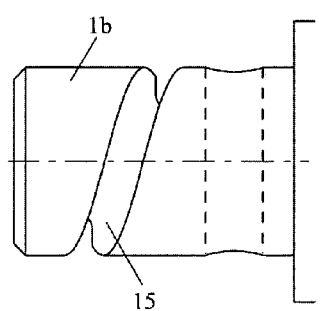
FIGS. 11A, 11B, 11C, 11D and 11E show the recirculation path on the peg of the worm assembly.
Figure 11B:
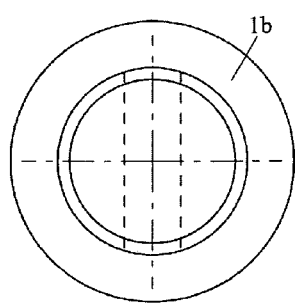
Figure 11C:
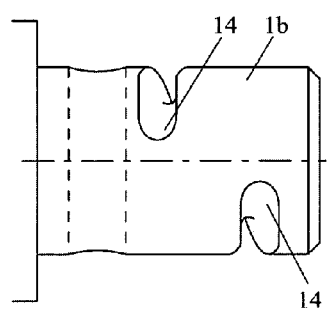
Figure 11D:
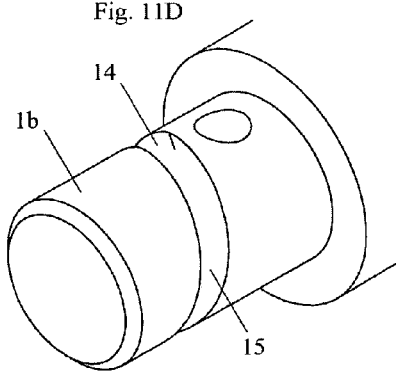
Figure 11E:
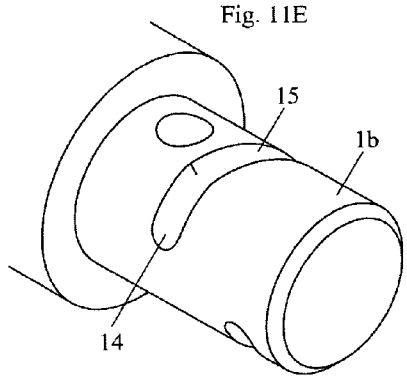
Figure 23:
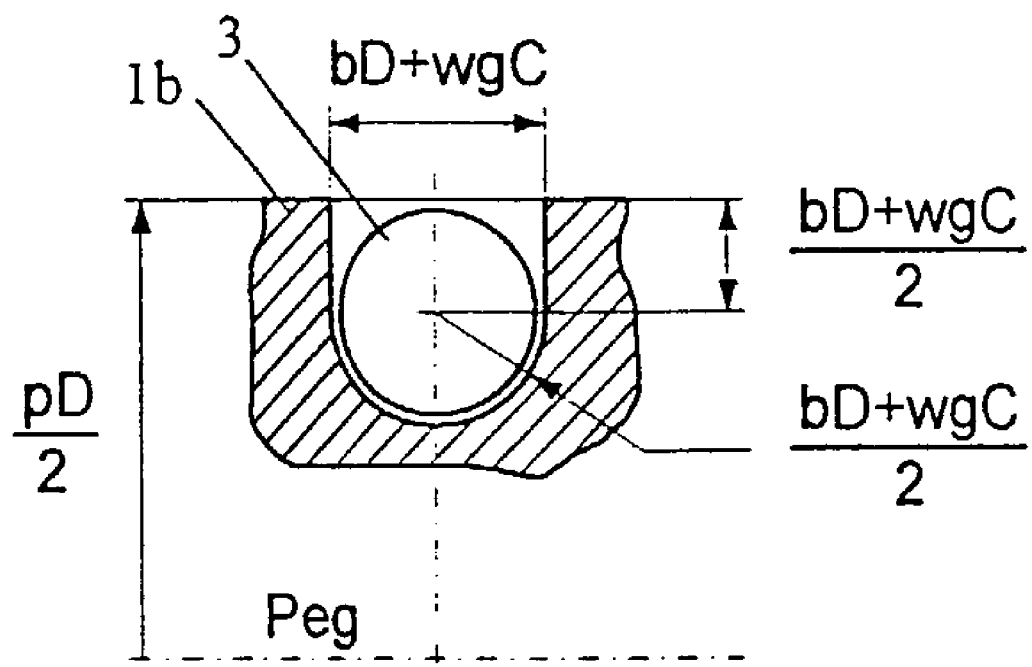
FIG. 23 shows the size of the peg channel.

FIGS. 11A, B, and C show three projection views of the peg 1b and FIGS. 11D and E are two isometric views. The recirculation hole of the worm part 1a presented in FIG. 9B continues (is coaxial and has the same size) into the peg 1b. This is the hole 14 in FIG. 11. The recirculation holes 14 continue into the recirculation helical channel 15 with a smooth (corner free) transition. The cross section of peg path is U shaped (see FIGS. 11 and 23) and it is sized such that the balls 3 may freely fit into the channel formed by the U shaped helix and the inner surface of the worm part.

In summary, the ball circulation path comprises the active path, the passive path, and the recirculation path. During motion, the active and passive paths cyclically cover the hyperboloidal helix of the worm. The recirculation path comprises the following elements: the recirculation ports (boss and fillet), the holes, and the peg helix. The ports are constructed within the worm part, and the recirculation helix is constructed on the peg, whereas the entry/exit holes are implemented in both the worm part and the peg. The peg is press-fitted into the worm part and a dowel pin is used to insure their relative orientation and further secure the assembly.

The ball-worm geometry is derived using the algorithm presented in the following table. A numeric example is presented in the right column. The table presents the calculations for a worm with a single thread. Multiple threads may similarly be implemented when high power/low transmission ratios are desired.

| Symbol | Description | Formula | Example |
|--------|-------------|---------|---------|
| | | General Definitions: | |
| TR | Transmission ratio | Right Hand TR > 0<br>Left Hand TR < 0<br>TR ∈ {N}<br>Equation 1 | 50 |

A right-hand transmission is defined (as for the classic worm transmission) by the right hand winding of the worm helix. The right/left hand type can be set using the positive/negative definition of the transmission ratio respectively. TR is set as an integer number (TR∈{N}).

| bD | Ball diameter | $bD \approx \dfrac{aD}{15}$<br>Equation 2 | $\frac{1}{16}$" = 1.587 [mm] | bD is set based on geometric and strength considerations. The formula shows the order of the dimension, where aD is the distance between the axes (Equation 9).

| wgC | Worm-gear Clearance | $wgC \approx \dfrac{bD}{16}$<br>Equation 3 | 0.1 [mm] |

Figure 12:
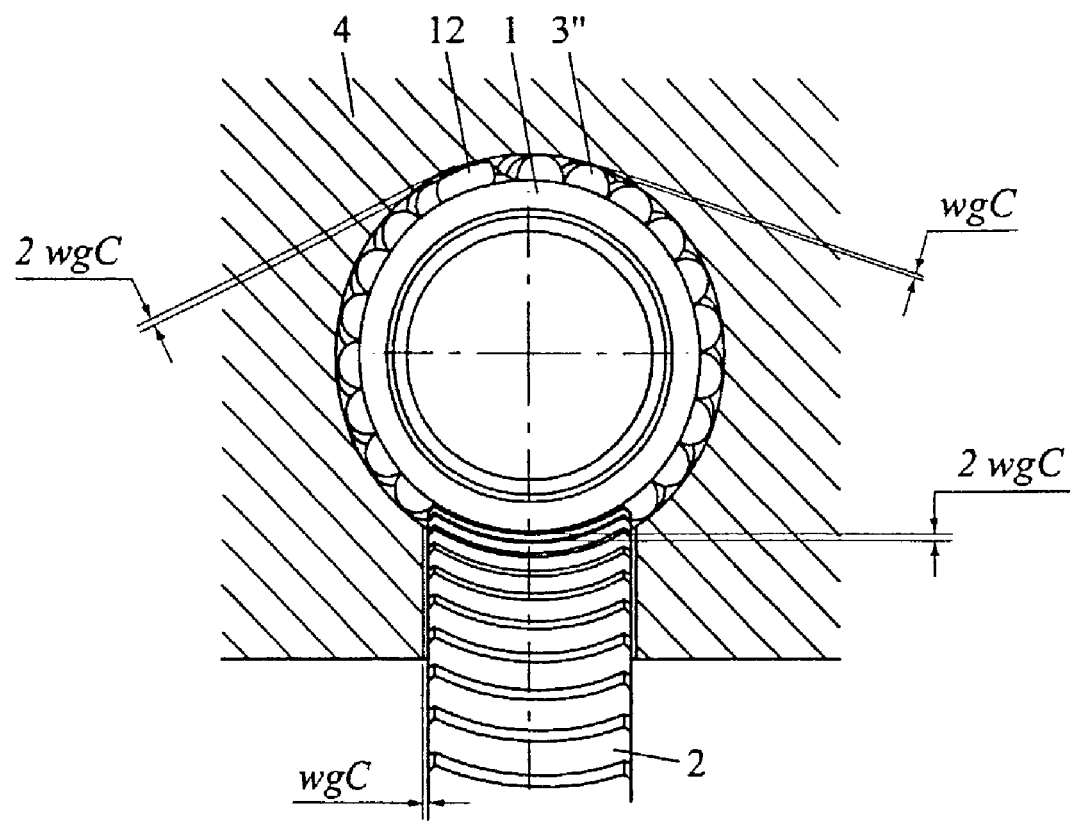
FIG. 12 shows the worm gear clearance parameter used for different components.

During motion the worm and the gear are not in direct contact. The motion transfer is realized through the rolling elements, as shown in FIGS. 4A, 4B, and 4C. The clearance between the worm and the gear is defined as 2 wgC, which is equally divided from the center of the ball to the two elements (see FIGS. 12 and 21). Its value will be used for defining the clearance of several other elements, such as the clearance between the balls and the race, the ball race and the gear, the recirculation ports and the gear, the recirculation ports and the ball race, etc. The formula above gives an approximate estimation of wgC. This value should be chosen as small as possible depending on the precision of manufacturing.

| pD | Peg diameter | $pD \geq \Phi_{min} + 2\,bD + 2\,wgC$<br>$pD \approx 6\,bD$<br>Equation 4 | 9.5 [mm] |

Figure 13:
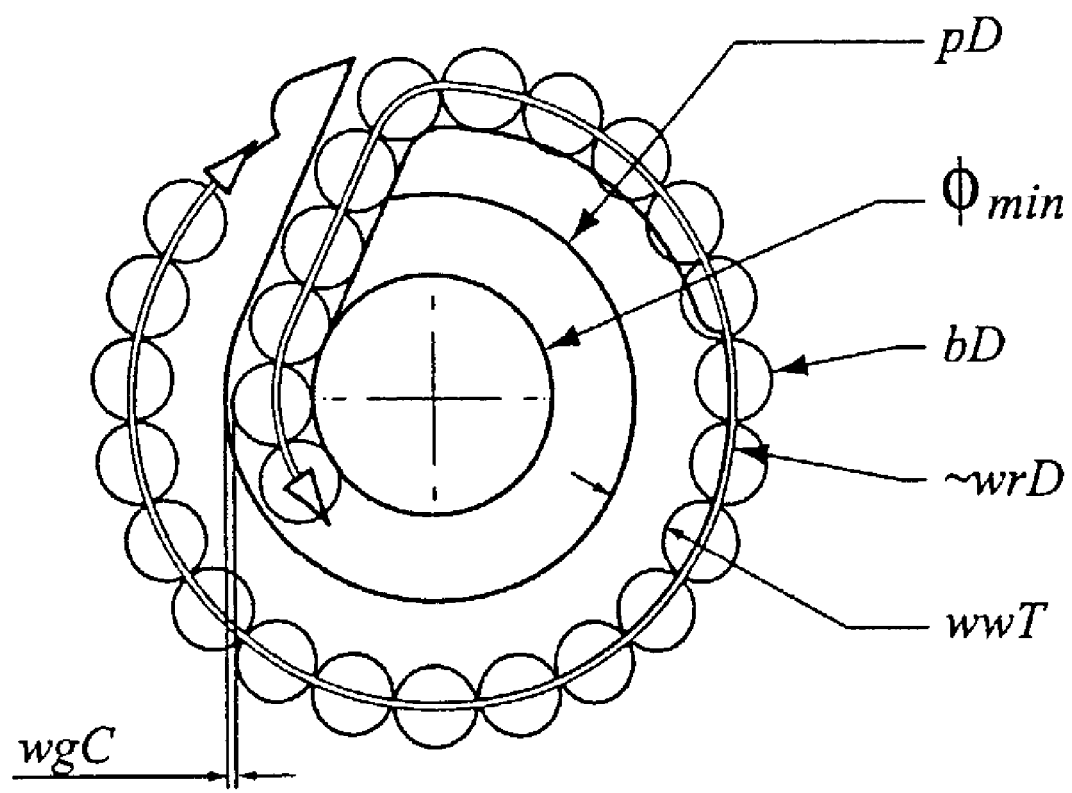
FIG. 13 shows the peg diameter (pD) and worming rolling diameter estimation.

The ball recirculation mechanism is constructed within the worm (FIGS. 9 and 11). FIG. 13 is a schematic similar to the cross section of FIG. 9B. $\Phi_{min}$ is the size of the peg at the base of its helix, which is set based on strength consideration ($\Phi_{min} \approx 3\,bD$). The formula shows that the peg should be large enough to allow for the construction of the recirculation helix over a minimum size base diameter ($\Phi_{min}$).

| wrD | Worm rolling diameter | $wrD > pD + 2\,wwT + bD$<br>Equation 5 | 12.0 [mm] |

Figure 14A:
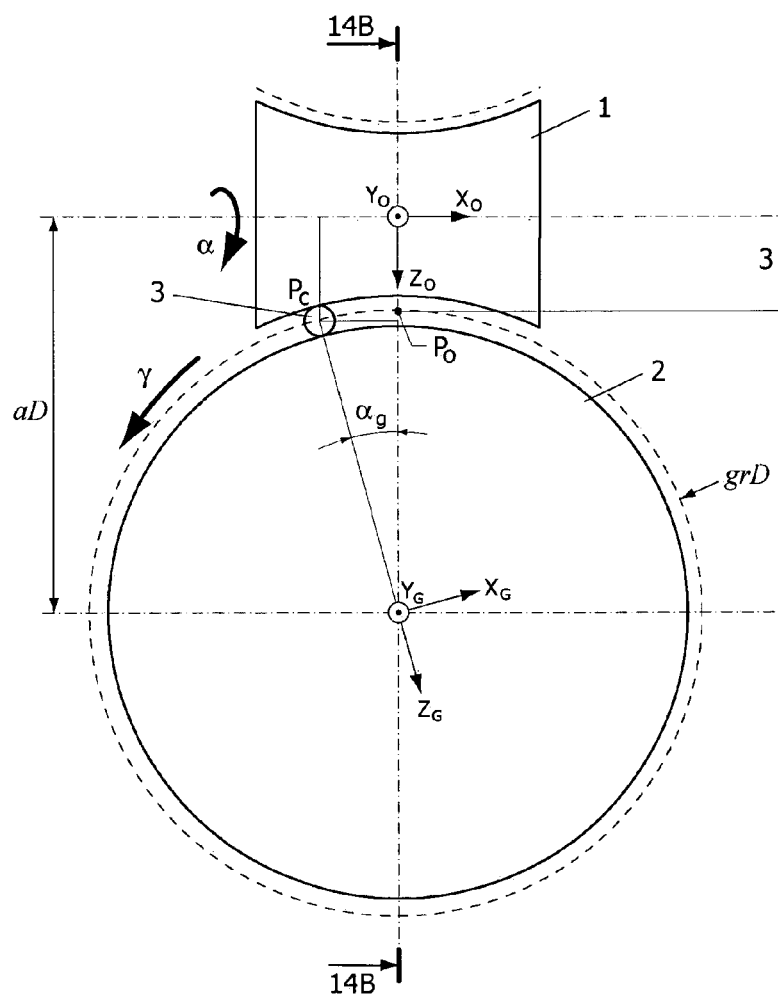
FIGS. 14A and 14B show central cross sections of the transmission.
Figure 14B:
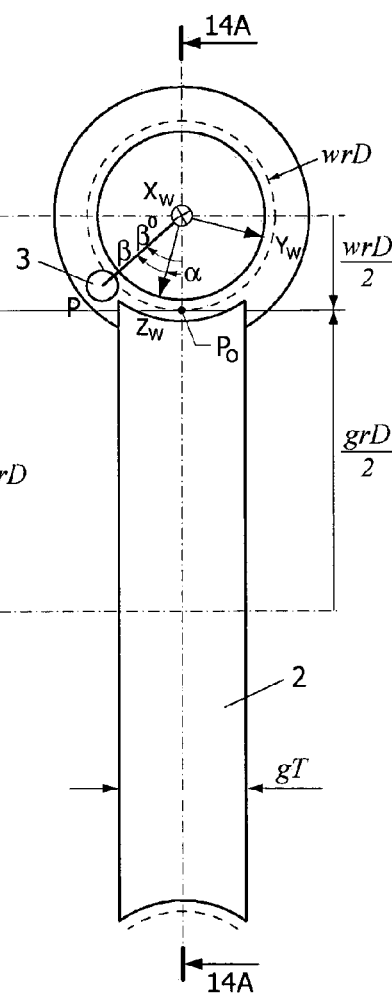

FIGS. 14A and 14B schematically present a frontal and lateral central cross section of the transmission. The worm helix is hyperboloidal. The worm rolling diameter is defined as the minimum diameter of the worm measured at the center of the balls rolling on its helical tooth, as represented in FIG. 14B.

Equation 5 gives an estimation of the minimum size of wrD, derived using the schematic in FIG. 13. This states that wrD should be large enough to cover the peg and maintain a minimum worm wall thickness (wwT) under the ball. After setting pD and wrD, the minimum (central) thickness of the wall under the helix may be calculated as:

| wwT | Worm wall thickness | $wwt \approx \dfrac{wrD - bD - pD}{2}$<br>Equation 6 | 0.456 [mm] |

The thickness wwT should be large enough to allow for the manufacturing of the worm part. For certain profiles of the worm tooth wwT is given by Equation 27.

| $\gamma_p$ | Gear angular pitch | $\dfrac{2\pi}{abs(TR)}$ [rad]<br> | 7.2 [deg] |

Figure 15:
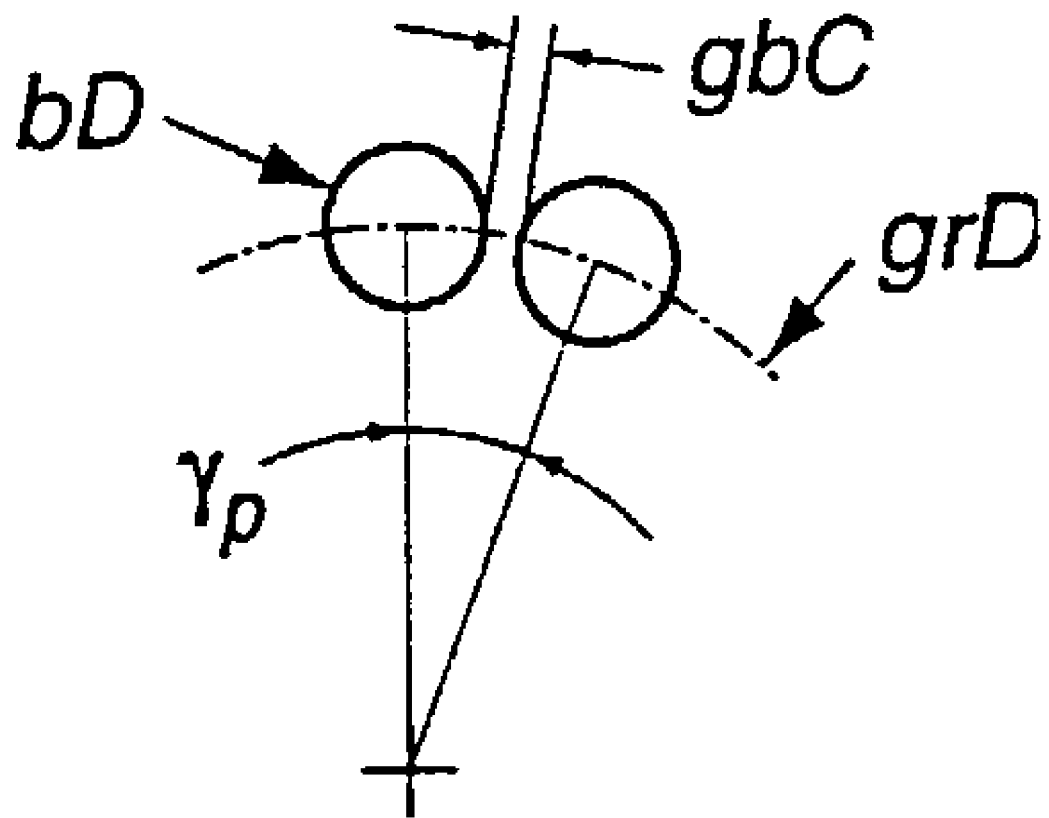
FIG. 15 shows the gear angular pitch and rolling diameter.

FIG. 15 presents two balls on consecutive teeth located in the central plane of the gear. The number of teeth on the gear equals the absolute value of the transmission ratio, abs(TR).

| grD | Gear rolling diameter | $grD > (bD + gbC)\dfrac{abs(TR)}{\pi}$<br>Equation 7 | 32.0 [mm] |

The gear rolling diameter is defined as the minimum diameter of the gear measured at the center of the balls rolling on its teeth, as represented in FIGS. 14A and 14B. This is the diameter on which the balls are rolling in the central section of the gear 14A—14A. grD is defined based on the ball diameter (bD) and the transmission ratio (TR), as presented in FIG. 15 so that the gear ball clearance (gbC) is large enough to define the tooth of the gear between the two balls. The resulting gap between the balls, which defines the thickness of the gear tooth, is then calculated as:

| gbC | Gear ball clearance | $gbC = \dfrac{grD}{2}\gamma_p[rad] - bD$<br>Equation 8 | 0.423 [mm] |
| aD | Axes distance | $aD = \dfrac{wrD + grD}{2}$<br>Equation 9 | 22.0 [mm] |

As presented in FIG. 14, aD is the distance between the axes of the worm 1 and the gear 2.

| | | | |
|---|---|---|---|
| $n_T$ | Number of active gear teeth | $n_T \in \{N\}$ | 2 |
| $n_B$ | Number of active balls per tooth | Set | 4.5 |

The active path (see FIG. 4A) spans over $n_T$ teeth of the gear. On each tooth there are $n_B$ active balls. Thus, the total number of active balls is $n_T \, n_T$. These have a significant influence on the kinematic performance and power capability of the transmission and should be adjusted based on the results of the gear tooth geometry. In general, a high $n_B$ increases power capabilities but deteriorates kinematic performance.

| | | | |
|---|---|---|---|
| gT | Gear thickness | $gT > wrD \, \text{Sin} \frac{n_B bD}{wrD}$ <br> Equation 10 | 7.0 [mm] |
| $\beta_{gT}$ | Worm angle at gT/2 | $\beta_{gT} = \text{Sin}^{-1}\left(\frac{gT}{wrD}\right)$ [rad] <br> Equation 11 | 35.385 [deg] |

Figure 16:
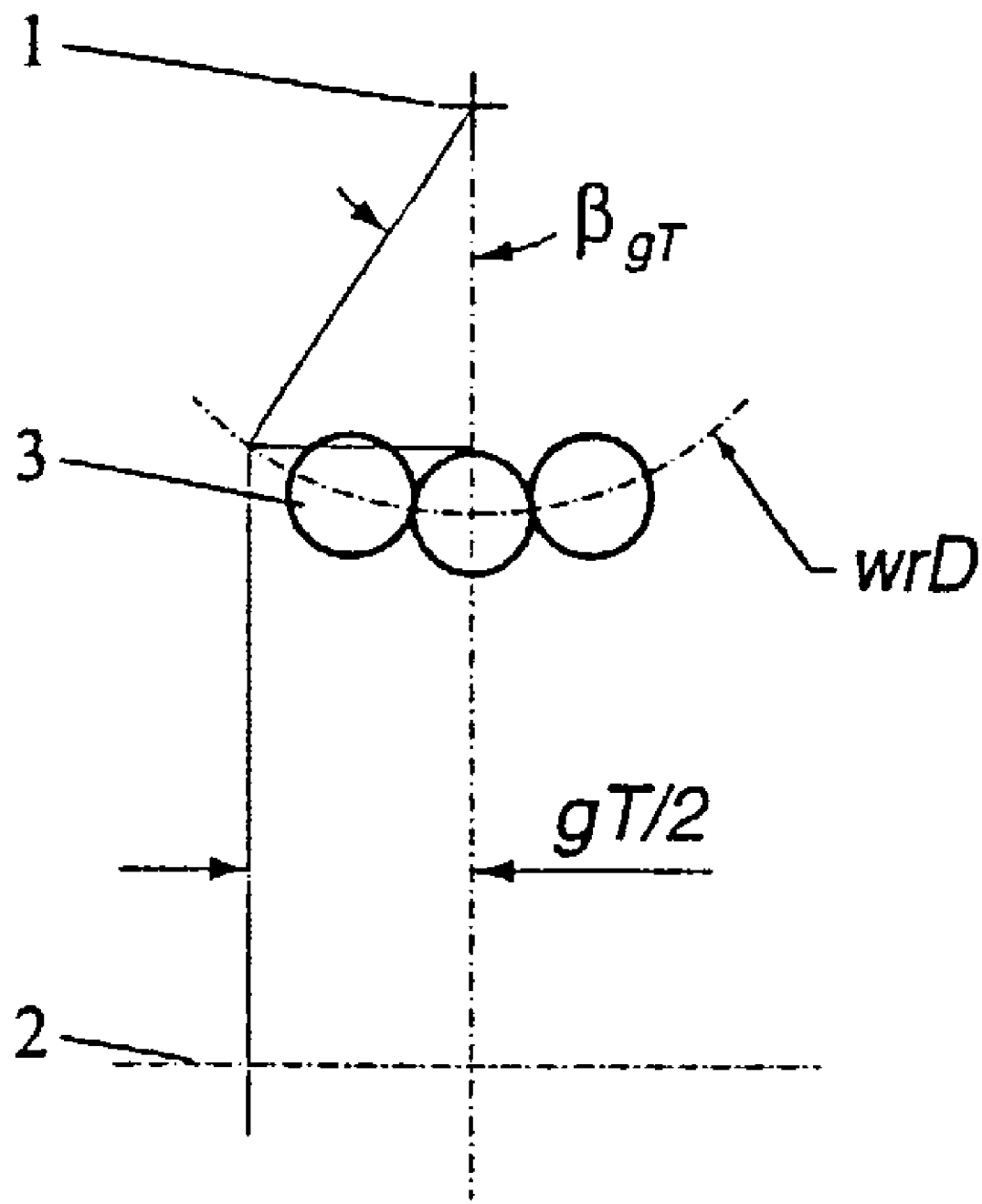
FIG. 16 shows the gear thickness and corresponding worm angle.

The thickness of the gear is set so that $n_B$ balls can fit on one gear. The worm angle at gT/2 is the rotation of the worm from the center to the side of the gear ($\beta_{gT}$), as presented in FIG. 16.

FIGS. 14A and 14B are used to mathematically define the worm helix and gear teeth geometry. Three Cartesian reference frames are defined: $X_O Y_O Z_O$ is a fixed reference frame; $X_W Y_W Z_W$ and $X_G Y_G Z_G$ are attached to the worm and gear respectively. The fixed and worm coordinate systems are centered at the center of the worm, whereas the gear system is located at the center of the gear. The rotation matrices from the fixed to the worm and gear coordinate systems are:

$$|OW| = \begin{bmatrix} 1 & 0 & 0 \\ 0 & \text{Cos}(\alpha) & -\text{Sin}(\alpha) \\ 0 & \text{Sin}(\alpha) & \text{Cos}(\alpha) \end{bmatrix} \quad \text{Equation 12}$$

$$|OG| = \begin{bmatrix} \text{Cos}(\gamma) & 0 & \text{Sin}(\gamma) \\ 0 & 1 & 0 \\ -\text{Sin}(\gamma) & 0 & \text{Cos}(\gamma) \end{bmatrix}$$

where $\alpha$ and $\gamma$ are the worm and gear rotation angles respectively (FIG. 14A). In general $\alpha$ angles refer to the rotation of the worm with respect to ground, $\beta$ (FIG. 14B) measures angles on the worm with respect to the coordinate system of the worm ($X_W Y_W Z_W$) as it rotates with $\alpha$, and $\gamma$ angles refer to the gear.

The kinematic transfer function and the output of the transmission (considering the worm as the driving element) are:

$$TR = \frac{\alpha}{\gamma} \Rightarrow \gamma = \frac{\alpha}{TR} \quad \text{Equation 13}$$

This is a signed expression defined by the right/left hand transmission of Equation 1.

| | | | |
|---|---|---|---|
| $\beta_{he}$ | Helix extension angle | $\beta_{he} > \frac{bD}{wrD}$ [rad] <br> Equation 14 | 8.0 [deg] |
| $\beta_h$ | Helix Angle | $\beta_h = \pi \, n_T + \beta_{he}$ [rad] <br> Equation 15 | 368.0 [deg] |

The worm helix has as many turns as the active number of gear teeth ($n_T$). For maintaining a constant number of active balls at any orientation of the worm, the worm helix is extended at each end with an angle $\beta_{he}$. This angle may later need to be updated to include the angle of the recirculation port fillet $\beta_f$ (FIG. 22A) on which the balls are not active, especially for large radii of the fillet $r_f$ (Equation 32). Thus, the helix of the worm is symmetrically distributed with respect to the center and spans over:

$$\beta: -\beta_h \rightarrow \beta_h \quad \text{Equation 16}$$

Consider a ball that for $\alpha=0$ has its center in the point $P_0$ located in the middle of the active zone (that is in the central planes 14A—14A and 14B—14B). As the worm is rotated with an angle $\alpha$, the point $P_0$ constrained to the middle plane of the gear 14B—14B shifts its position to $P_c$ (central). This corresponds to the position of the gear rotated with $\gamma=\alpha/TR$. The position vector of $P_c$ in the fixed coordinate system $X_0 Y_0 Z_0$ may be expressed as:

$$P^O_{c(\alpha)} = \left[-\frac{grD}{2}\text{Sin}(\gamma) \; 0 \; aD - \frac{grD}{2}\text{Cos}(\gamma)\right]\bigg|_{\gamma=\frac{\alpha}{TR}} \quad \text{Equation 17}$$

The position of a point P of the worm helix is then obtained by relaxing the central plane constraint in the worm coordinate system, as:

$$P^W_{(\beta)} = P^O_c \, |OW| \, |_{\alpha \rightarrow -\beta} \quad \text{Equation 18}$$

Since the helix is defined with respect to the worm, the variable $\alpha$ is substituted by the equivalent on-worm angle $-\beta$. Thus:

$$P^W_{(\beta)} = \begin{bmatrix} \frac{grD}{2}\text{Sin}\left(\frac{\beta}{TR}\right) \\ -\left(aD - \frac{grD}{2}\text{Cos}\left(\frac{\beta}{TR}\right)\right)\text{Sin}(\beta) \\ \left(aD - \frac{grD}{2}\text{Cos}\left(\frac{\beta}{TR}\right)\right)\text{Cos}(\beta) \end{bmatrix}^T \quad \text{Equation 19}$$

The coordinate vector $P_{(\beta)}^W$ is a function of the independent variable $\beta$. Equation 19 defines the geometry of the hyperboloidal helix of the worm given by the trajectory of the center of a ball rolling in the transmission.

Figure 17:
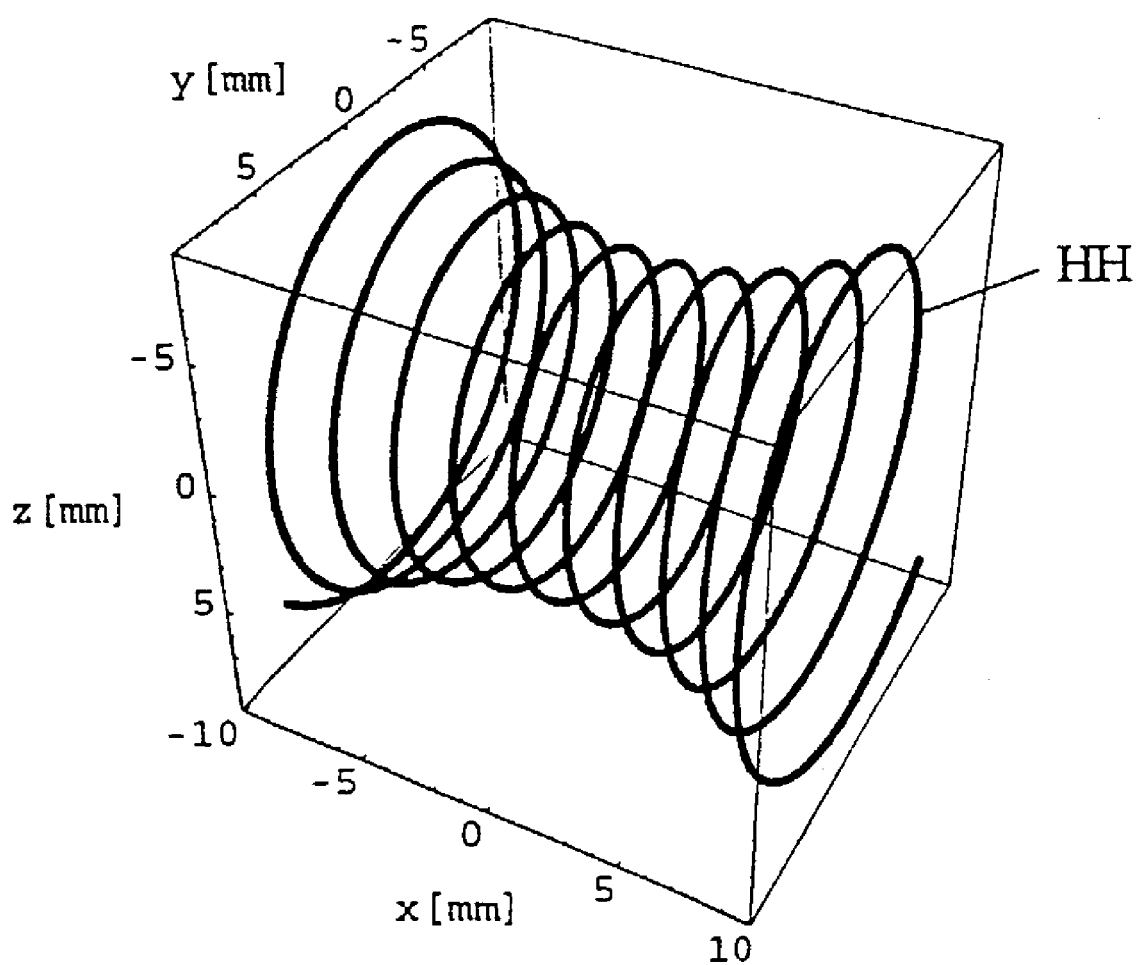
FIG. 17 shows the hyperboloidal helix of the worm at the ball center for $n_T=10$ and $\beta_{he}=45°$.

A parametric plot of $P^W(\beta)|\beta: -\beta_h \rightarrow \beta_h$ is shown in FIG. 17, which shows the hyperboloidal helix of the worm at the ball center. In order to highlight the hyperboloidal shape of the helix (with variable pitch and diameter) and its end part extensions, the graphics has been rendered for a high number of turns ($n_T=10$) and a large extra angle ($\beta_{he}=45°$).

One significant novel feature of the present invention lies in the gear tooth geometry. Namely, according to the present invention, the teeth of the gear have a full thickness along this central plane 14A—14A of the gear and a lesser thickness towards both sides of the gear. As a result, the gap which is defined between the gear teeth is larger towards both sides of the gear than in the central plane of the gear. This novel gear tooth gap 20 defined by the ball center is shown in FIG. 18.

The gear tooth gap corresponds to the space swept by the collection of balls rolling between the worm and the gear during a full engagement cycle; that is the rotation of the gear from where the tooth comes in until the tooth comes out of the engagement region taking as many turns of the worm as the number of its helix turns $n_T$.

The tooth geometry is defined as the trajectory of the center of the balls with respect to the tooth of the engaged (rotating) gear. And according to the present invention, the tooth geometry is derived from the intersection of the worm helix with the gear. During a full engagement cycle, this intersection curve varies depending on the relative orientation of the worm and gear. The envelope of these intersection curves is a surface 20, as presented in FIG. 18, defining the tooth geometry.

Figure 18:
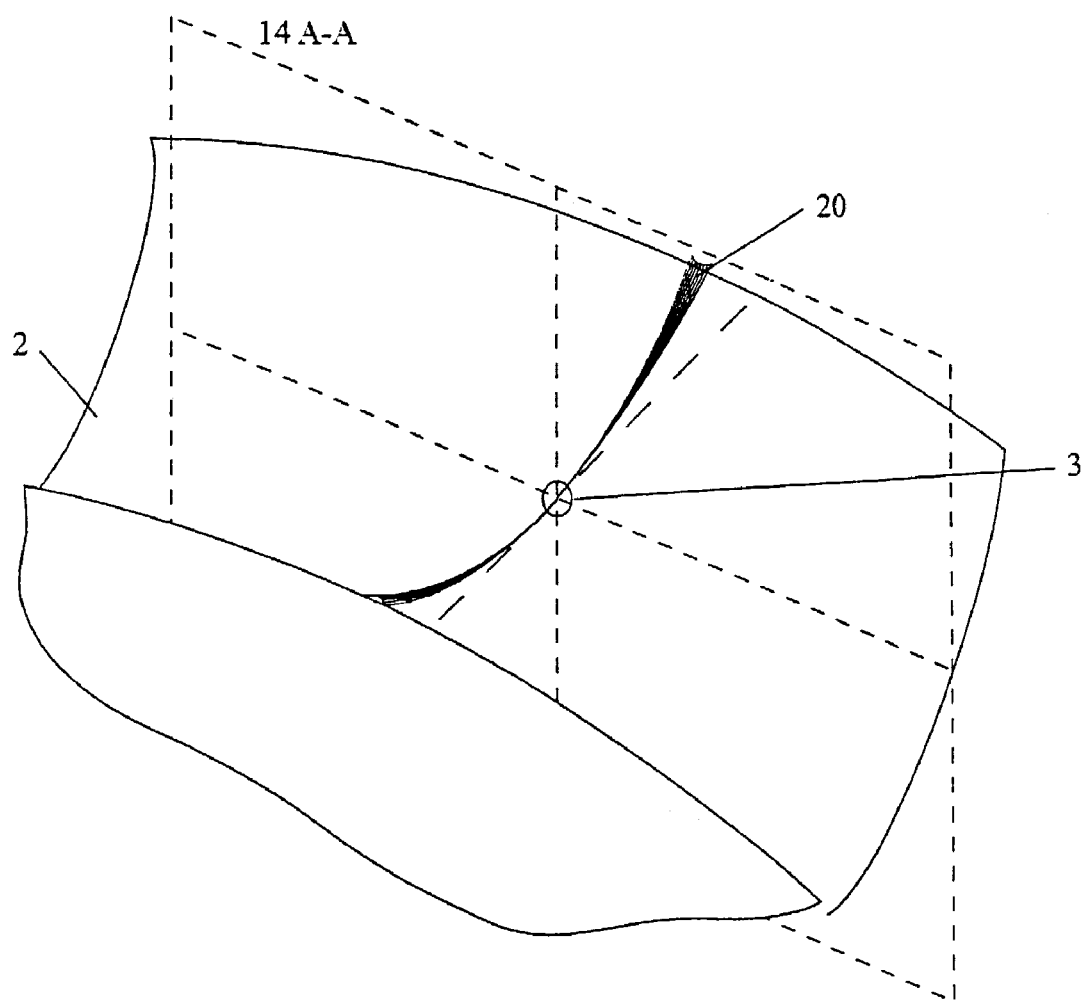
FIG. 18 shows the novel gear tooth geometry of the present invention.

As illustrated in the FIG. 18, in the central plane 14A-A of the gear 2, all balls pass through the same point so that the gap is structured to be thinner and the tooth thicker, whereas in other sections the balls occupy different locations during motion so that the gap is structured to be wider with a narrower tooth.

The present invention provides exact mathematical definitions of the above described tooth geometry to achieve the surface shown in FIG. 18. These equations are critical for achieving optimal performance for the transmission.

If, for example, the tooth gap were too wide at some locations the transmission would exhibit backlash, whereas if the tooth gap were too narrow the balls would jam. The present invention, however, provides a unique and optimal solution for the tooth geometry which is essential for achieving a smooth functionality of the transmission with minimal backlash.

A point of the worm helix with respect to the ground reference frame $X_O Y_O Z_O$ may be expressed as:

$$P^O_{(\alpha,\beta^0)} = \left( P^W_{(\beta)} \Big|_{\beta \to -\alpha+\beta^0} \right) |OW|^T \qquad \text{Equation 20}$$

where $\beta^0 = \alpha + \beta$ defines an angle on the rotated worm with respect to the ground, as presented in FIG. 14B. Equation 20 is the position vector in the ground coordinate system of a point of the helix specified by the angle $\beta^0$ measured with respect to the ground, when the worm is rotated with $\alpha$. Thus, the point at $\beta=0$ refers to a point of the helix that is currently (for any $\alpha$) in the central plane of the gear. The point at $\beta=\pm\beta_{gT}$ refers to a point of the helix that is currently on a face of the gear (at gT/2 from center).

For verification, Equation 20 evaluated for $\beta^0=0$ should yield the original definition $P_c^O$ in Equation 17.

The position of a helix point P in the gear coordinate system $X_G Y_G Z_G$ is:

$$P^G_{(\alpha,\beta^0)} = \left( P^O_{(\alpha,\beta^0)} - \begin{bmatrix} 0 \\ 0 \\ aD \end{bmatrix}^T \right) |OG| \qquad \text{Equation 21}$$

-continued $$P^G_{(\alpha,\beta^0)} = \begin{bmatrix} \left(aD + \left(\frac{grD}{2}\cos\left(\frac{\alpha-\beta^0}{TR}\right) - aD\right)\cos(\beta^0)\right)\sin\left(\frac{\alpha}{TR}\right) + \\ \frac{grD}{2}\cos\left(\frac{\alpha}{TR}\right)\sin\left(\frac{\beta^0-\alpha}{TR}\right)\left(\frac{grD}{2}\cos\left(\frac{\alpha-\beta^0}{TR}\right) - aD\right) \\ \sin(\beta^0) - \left(aD + \left(\frac{grD}{2}\cos\left(\frac{\alpha-\beta^0}{TR}\right) - aD\right)\cos(\beta^0)\right) \\ \cos\left(\frac{\alpha}{TR}\right) + \frac{grD}{2}\sin\left(\frac{\alpha}{TR}\right)\sin\left(\frac{\beta^0-\alpha}{TR}\right) \end{bmatrix}^T$$

In this equation $\alpha$ measures the rotation of the worm and $\beta^0$ defines the angular position of the point on the worm with respect to the ground.

The gear tooth geometry is given by the collection of points $P_{(\alpha,\beta^0)}{}^G$ when the worm is rotated with an angle that spans over the whole helix ($\alpha$: $-\beta_h \to \beta_h$) in all transversal sections of the gear ($\beta^0$: $-\beta_{gT} \to \beta_{gT}$), as represented in FIGS. 19A, 19B, 19C and 19D. This defines the shape of the tooth "cut" by the worm into the gear. These drawings present an isometric representation of the geometry and three orthogonal projections on the planes of the fixed coordinate system $X_O Y_O Z_O$.

The formula in Equation 21 prescribes the geometry of the tooth specified at the center of the rolling elements. This defines the gap between consecutive gear teeth. As shown in FIGS. 19A, 19B, 19C and 19D, the tooth of the gear has variable thickness. In the central plane of the gear 14A-A the tooth has full thickness, whereas towards the sides the tooth is thinner (where the gap is larger).

The gear may be manufactured by generating the teeth with a "worm-tool", a tool on the shape of the worm with cutting elements in the shape of the balls distributed on the helical path. This is a high production method only requires the worm geometry, the geometry of the gear resulting from the machining process.

This manufacturing process is not efficient for low production series. In this case the gear should be manufactured by using a 4-axes CNC milling process with either a Gothic arch endmill or a combination of two ball end-mills, as presented in the following sections. The method requires an explicit mathematic definition of the gear geometry as given in Equation 21. The gear is mounted on a rotary table and the tooth gap is generated using endmills. The linear and rotary axes are moved in coordinated motion based on the gear geometry. The rotary table is used to index the teeth and to rotate the gear as the end mill moves from one flank of the gear to the other.

For the gear milling process it is recommended for the endmill to operate in the vertical plane passing through the axis of the gear to be manufactured (in the case of vertical mills). In the schematic representation of FIG. 14A, this plane is represented by the $Y_G Z_G$ plane. This is essentially important in the case of using a Gothic arch endmill. In the orthogonal view XY of the tooth geometry in FIG. 19D it may be observed that the tooth is oblique on the gear axis. Machining this geometry would require the end mill to leave the axial vertical plane.

In order for the endmill to operate in the central plane above the gear axis, the gear is slightly rotated as the end mill sweeps from one flank to the other of the gear ($\beta^0$: $-\beta_{gT} \to \beta_{gT}$ of Equation 21). Specifically, for a transversal section given by $\beta^0$ the gear is rotated with the corresponding gear angle $\gamma^0 = \beta^0/TR$. Equation 21 yields:

$$P^{G\gamma^0}_{(\alpha,\beta^0)} = P^{G}_{(\alpha,\beta^0)} \left( |OG| \Big|_{\alpha \to \beta^0} \right) \text{ for } \begin{cases} \alpha : -\beta_h \to \beta_h \\ \beta^0 : -\beta_{gT} \to \beta_{gT} \end{cases} \quad \text{Equation 22}$$

Figure 20:
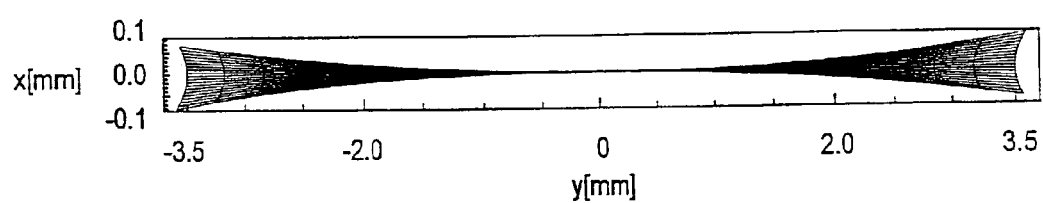
FIG. 20 shows the tooth geometry for a 4-axes milling machining process of the gear.

The tooth is then given by the collection of points $P_{(\alpha,\beta^0)}{}^{G\gamma^0}$. An orthogonal view of the resulting profile is presented in FIG. 20. By rotating the gear the tooth axis appears straight.

The tooth geometry of the worm and gear presented above is given by the trajectory of the center of the balls. The tooth profile is the shape of the tooth in a section perpendicular to the trajectory. The tooth profile refers to the profile of the worm and the gear, and it is normally selected of the same type for both components. The profile can be either circular or Gothic arch shaped, or presenting a double-circular undercut profile as presented in FIGS. 21A, 21B, and 21C.

The circular profile (FIG. 21A) and Gothic arch profile (FIG. 21B) have been known in the prior art. The advantage of the Gothic arch compared to the circular profile is generated by the point contact of the rolling elements on the worm and gear. The ball rolls between the elements with only 4 points of contact. The clearance in the other points of the ball eliminates sliding friction. Moreover, the design allows for the fine adjustment of the distance between the axes (aD) in order to minimize backlash. This allows for adjusting aD until the contact is realized on the 4 points. For the circular profile this adjustment is impossible to achieve since the ball bottoms at the base of the profile.

Figures 21A, 21B, 21C:
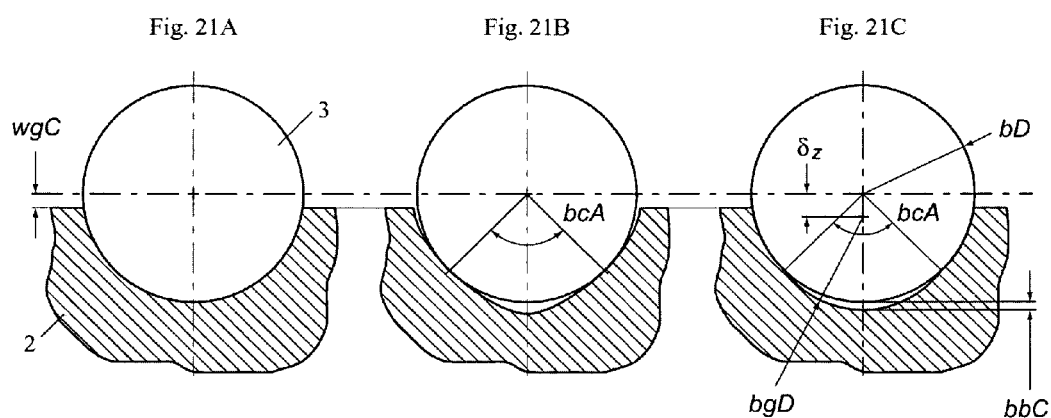
FIGS. 21A, 21B, and 21C respectively show the circular, Gothic arch, and double circular tooth profiles.

The double-circular profile shown in FIG. 21C is outlined by two round profiles of different diameters presenting an offset on the normal direction. The design is somewhat similar to the Gothic arch profile, except for the fact that it generates an arch rather than point contact. Even though this scheme introduces limited sliding friction on the ball, it significantly enhances kinematic and power capabilities by providing support of the ball in close proximity of the ball center (as close as wgC). A close-to-center contact could not be achieved by increasing the contact angle in the Gothic arch design because the ball would be unsupported close to the base and lock due to a wedging effect. The close proximity of the contact region to the ball center in the double-circular design also insures that the sliding friction is minimal, since the relative sliding velocity is proportional to this distance. In addition, the double-circular design allows for the fabrication of the worm and gear with standard ball endmill tools.

The following equations define the double-circular profile:

The contact angle bcA and groove diameter bgD should be adjusted to obtain sufficient clearance bbC under the ball. In addition, for the worm bbC reduces the thickness of the worm under the helix wwT given by Equation 6 (see FIG. 13), and should be reiterated if necessary:

| wwT | Worm wall thickness | $wwT = \dfrac{wrD - bD - pD}{2} - bbC$ Equation 27 | 0.353 [mm] |

Figure 22A:
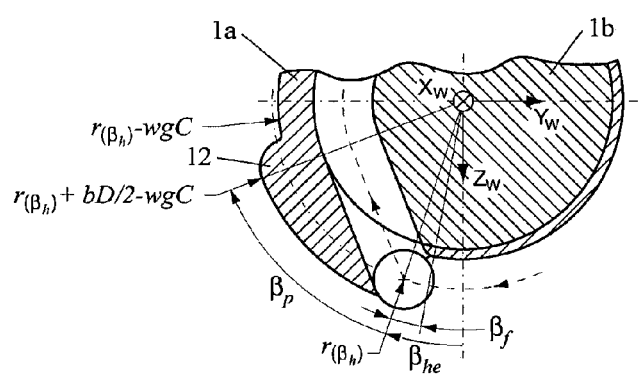
FIGS. 22A and 22B show transversal cross sections of the worm assembly through the recirculation port.
Figure 22B:
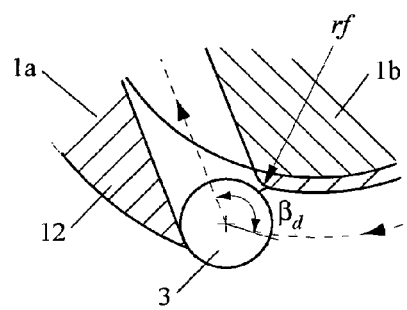

FIGS. 22A and 22B present a transversal section of the worm-peg assembly at the recirculation port, which is the end of the worm helix $(\beta_h)$. The schematic uses the worm coordinate system $X_W Y_W Z_W$ presented in FIG. 14A.

The center of the ball on the active path is located at a distance $r_{(\beta)}$ from the worm axis, which is the radius of the worm helix depending on the worm angle $\beta$. This may be calculated using the Z component of the position vector in Equation 17, as:

$$r_{(\beta)} = P^{O}_{c(\beta)} \begin{bmatrix} 0 \\ 0 \\ 1 \end{bmatrix} = aD - \frac{grD}{2} \text{Cos}\left(\frac{\beta}{TR}\right) \quad \text{Equation 28}$$

At the end of the worm helix, the ball is located at $r_{(\beta_h)}$, as shown in FIG. 22A.

| $\beta_p$ | Angle of the recirculation port | $\beta_p = \text{Cos}^{-1}\left(\dfrac{pD - bD}{2r_{(\beta_h)}}\right)$ [rad] Equation 29 | 49.819 [deg] |

The angle of the recirculation port $\beta_p$ presented in FIG. 22A defines the orientation of the recirculation hole and the length of the path deflection boss.

The hole of the recirculation port starts at the end of the worm helix 1*a*, has an axis in the transversal plane of the worm, and is internally tangent to the outer surface of the peg 1*b*.

The path deflection boss 12 (FIG. 10A) presents a semi-circular cross section of $$\frac{bD}{2} - wgC$$

radius (FIG. 21A) with the center located in the continuation of the worm helix ($\beta: \beta_h \to \beta_h = \beta_p$ and negative at the other

| bcA | Ball contact angle | bcA = 90° ± 15° Equation 23 | 80° |
| bgD | Ball groove diameter | bgD < bD Equation 24 | 3/64 " = 1.190 [mm] |
| $\delta_Z$ | Ball groove offset | $\delta_Z = \dfrac{bD}{2}\text{Cos}\left(\dfrac{bcA}{2}\right) - \dfrac{1}{2}\sqrt{bgD^2 - bD^2\text{Sin}\left(\dfrac{bcA}{2}\right)^2}$ Equation 25 | 0.301 [mm] |
| bbC | Ball base clearance | $bbC = \delta_Z + \dfrac{bgD - bD}{2}$ Equation 26 | 0.102 [mm] | end), as given by Equation 19. However, this may be placed on a constant distance $r_{(\beta_h)}$ (Equation 28) from the worm axis, as shown in FIG. 22A. The Cartesian equation of the boss trajectory is:

$$B_{(\beta)}^W = \begin{bmatrix} \frac{grD}{2}\sin\left(\frac{\beta}{TR}\right) \\ -\left(aD - \frac{grD}{2}\cos\left(\frac{\beta_h}{TR}\right)\right)\sin(\beta) \\ \left(aD - \frac{grD}{2}\cos\left(\frac{\beta_h}{TR}\right)\right)\cos(\beta) \end{bmatrix}^T \quad \text{Equation 30}$$

where the independent parameter is $\beta$: $\beta_h \rightarrow \beta_h + \beta_p$ for the positive side boss and $\beta$: $-\beta_h \rightarrow -(\beta_h + \beta_p)$ on the other.

| $\beta_d$ | Path deflection angle | $\beta_d = \pi - \beta_p$ Equation 31 | 130.181 [deg] |
|---|---|---|---|

The path deflection angle is the only discontinuity on the ball circulation path. This is a very important parameter for the smooth functionality of the transmission. The design should account for obtaining values as close as possible to $\pi$.

| rf | Radius of the recirculation fillet | rf ≈ 0.75 bD Equation 32 | 1.19 [mm] |
|---|---|---|---|

A small radius rf is used to facilitate the transition of balls from the active path into the recirculation hole, thus smoothing the $\beta_d$ discontinuity. The angle $\beta_f$ (FIG. 22A, measured at the center from the beginning of the fillet to the end of the helix) corresponding to the part of the fillet on which the balls are not supported (inactive) is then numerically evaluated and used to augment the helix extension angle $\beta_{he}$ of Equation 14. This should ensure that a constant number of balls is active at any rotation of the worm.

The recirculation helix of the peg 1b (FIGS. 11A, 11B) has a constant radius and spans for less than one turn in opposite direction of the worm helix. A corner-free profile is implemented at the transition between the cylindrical and helical trajectories (See FIG. 24.) A clearance wgC is implemented on the sides and at the base of the peg recirculation channel, to facilitate the transition of balls as presented in FIG. 23.

For defining the geometry of the peg helix it is convenient to consider a reference frame rotated with 180° around the X axis with respect to the worm coordinate system $X_W Y_W Z_W$ presented in FIG. 14A. With this, the angle $\beta=0$ points upward from the center of the worm-peg assembly.

| $\beta_{ph}$ | Peg helix angle | $\beta_{ph} = \pi - (\beta_{he} + \beta_p)$ [rad] Equation 33 | 122.181 [deg] |
|---|---|---|---|

The helix of the peg spans for $\beta$: $-\beta_{ph} \rightarrow \beta_{ph}$. The radius of the helix is constant at $$\frac{pD - (bD + wgC)}{2}$$

and the X coordinate is given by:

$$X_p = \left(P_{(\beta)}^W\Big|_{\beta=\beta_h}\right)\begin{bmatrix}1\\0\\0\end{bmatrix}\sin\left(\frac{\pi\beta}{2\beta_{ph}}\right) \quad \text{Equation 34}$$

$$X_p = \frac{grD}{2}\sin\left(\frac{\beta_h}{TR}\right)\sin\left(\frac{\pi\beta}{2\beta_{ph}}\right)$$

Figure 24:
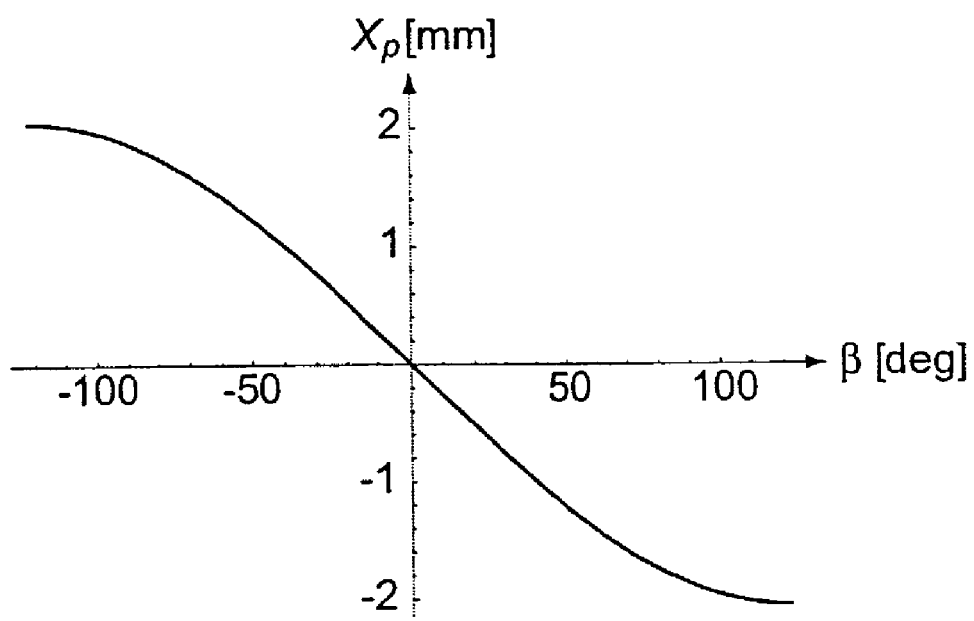
FIG. 24 shows the peg helix coordinate $X_p$ versus the angle $\beta$: $-\beta_{ph} \rightarrow \beta_{ph}$

This sinusoidal function creates a smooth transition from the linear ball trajectory of the recirculation hole into the recirculation helix, as represented in FIG. 24.

The initial prototype has been manufactured using a three-axes HAAS VF-1 vertical machining center equipped with a fourth rotary axis. The machining program (G code) was been generated on a Pentium based PC by using the Mathematica language (by Wolfram Research)—i.e. the Mathematica code generates the G code.

The overall size of the assembly including the bearings is 54×28×67 mm. The transmission uses 63 spherical balls of ⅟₁₆" (1.5875 mm) diameter to implement a transmission of 72:1 ratio with a 30 mm distance between the axes. The base worm and gear rolling diameters are 12 mm respectively 48 mm. The transmission exhibits no perceptible backlash and minimal friction.

Figure 25:
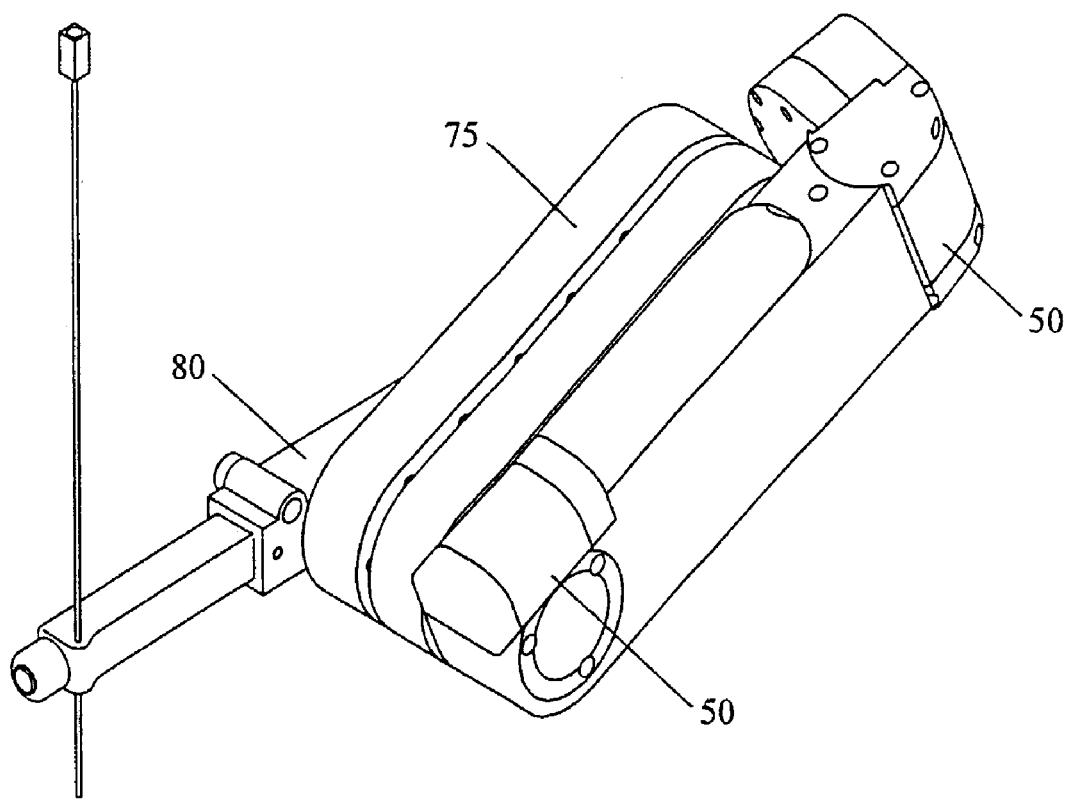
FIG. 25 shows the Remote Center of Motion surgical robot driven by two ball-worm joints.

The ball-worm transmission has also been implemented to an RCM (Remote Center of Motion) surgical robot as shown in FIG. 25. The original RCM design used two classic worm mechanisms, which rendered backlash and reduced dynamic performance. With the ball-worm transmission of the present invention, the RCM achieves significant performance improvements.

In summary, the present invention substitutes rolling friction implemented by spherical balls for the sliding friction of the classic worm transmission to implement rotational transfer. Several major advantages of the ball-worm mechanism as compared to the classic worm result from this reduction of friction forces, as follows.

The ball-worm transmission of the present invention may be constructed with minimal backlash between the worm and the gear. This is impossible to achieve with a classic worm transmission. Depending on the distance between the axes of the worm and gear the classic worm transmission either presents backlash or it is locked by friction. Due to the elimination of sliding friction by the rolling elements, in the case of the ball-worm the balls may be slightly preloaded between the worm and the gear. In the presence of rolling this loading force does not generate large magnitude friction forces. Ball preloading is common in mechanisms such as ball bearings and ball-screws.

The absence of play between input and output shafts of the ball-worm transmission and the uniform transmission ratio of the mechanism render kinematic precision. The output shaft motion is fully defined given the input shaft motion.

The substitution of the high magnitude friction forces with low rolling friction significantly reduces the energy loss in the transmission. Thus the ball-worm transmission achieves a highly efficient mechanism.

The construction of the classic worm and gear requires the use of dissimilar, friction-paired materials such as the steel and bronze alloys. This is required by the sliding friction between the two elements. Commonly, the mechanical strength of one of the friction-paired materials is much lower than the other thus reducing the overall strength of the mechanism and the power capability of the transmission. In the ball-worm transmission of the present invention, by contrast, the requirement for using friction-paired materials is eliminated by the rolling principle. Both the worm and the gear may now be constructed of high strength materials thus increasing power capabilities.

In addition, whereas the classic transmission requires sustained lubrication, the ball-worm transmission may operate with minimal or even without lubrication. This increases the implementation range of the mechanism to applications for which excessive lubrication is undesirable, such as in surgical and food processing systems.

Still further, due to its similar architecture the ball-worm transmission inherits several advantageous characteristics of the classic worm, as follows.

The ball-worm transmission may be configured to render a backdrive or non-backdrive mechanism. Similar to the classic worm mechanism, the mechanism may be designed to be backdrivable by increasing the pith of the worm. The non-backdrivability region, however, is narrower in the case of the ball-worm transmission due to reduced friction. A non-backdrivable ball-worm mechanism presents lower pitch and higher transmission ratio than a similar classic worm.

The ball-worm transmission exhibits high transmission ratios. This characteristic is inherited from the spiral shape used in worm mechanisms.

As in the case of the classic worm, the ball-worm transmission may also be constructed hyperboloidal or cylindrical. The hyperboloidal configuration (described hereinabove) yields increased power capability as well as improved backlash characteristics; however, it requires the worm and the gear to be paired. A certain worm may only engage the gear that it was designed for. By contrast, the cylindrical worm may be used in conjunction with a family of properly matched gears. Nevertheless, this shortcoming of the hyperboloidal ball-worm is a common characteristic of all hyperboloidal worms.

As for ball-screws, a smoother functionality of the mechanism can be achieved by intercalating softer material (plastic, copper) balls between the balls of the transmission. This however reduces the power capability of the mechanism.

In addition, the particular design of the ball recirculation path allows miniaturization. The ball recirculation path is constructed within the worm using a two-part construction. The path deflection element of the ball port is also implemented into the worm. This design creates a short circulation path requiring a reduced number of balls. The ball deflection elements and the recirculation helix also create a smooth circulation path with only two points of small discontinuity in the ball trajectory.

We claim:

1. A ball-worm transmission assembly comprising:
a worm;
a plurality of spherical balls; and
a gear coupled to the worm via the plurality of spherical balls;
wherein the gear comprises a plurality of teeth each having a thickness in a central plane of the gear and a lesser thickness towards both sides of the gear, so that a gap is defined between the teeth which is larger towards both sides of the gear than in the central plane of the gear; and
wherein a ball path of the spherical balls comprises: (i) an active path along which the balls roll between the worm and the teeth of the gear so as to engage the gear and the worm: (ii) a passive path along which the balls roll on the worm outside the teeth of the gear; and (iii) a ball recirculation along which the balls pass through the worm;
wherein the gap, between the teeth of the gear is defined to correspond to the space swept by the balls on the active path rolling between the worm and the gear during a full engagement cycle of the worm and the gear, so as to allow passage of the balls on the active path with a minimized amount of backlash.

2. The ball-worm transmission assembly according to claim 1, wherein the worm comprises a hyperboloidal helix.

3. The ball-worm transmission assembly according to claim 2, wherein: (i) the balls roll between the hyperboloidal helix of the worm and the teeth of the gear on the active path; (ii) the balls roll on the hyperboloidal helix of the worm outside the teeth of the gear on the passive path; and (iii) the balls pass through the worm from one end of the hyperboloidal helix to another end of the hyperboloidal helix on the recirculation path.

4. The ball-worm transmission assembly according to claim 3, further comprising an outer race to constrain the balls on the passive path.

5. The ball-worm transmission assembly according to claim 4, wherein the ball race comprises an internal revolute hyperboloidal surface for maintaining contact of the balls on the hyperboloidal helix of the worm.

6. The ball-worm transmission assembly according to claim 1, wherein the worm comprises a worm part and a peg part which are concentrically coupled to each other.

7. The ball-worm transmission assembly according to claim 6, wherein the worm part comprises at least one recirculation port.

8. The ball-worm transmission assembly according to claim 7, wherein an oblique hole is formed in the worm part, and the at least one recirculation port comprises a deflection boss formed on the worm part for forcing the spherical balls into the oblique hole and onto the recirculation path.

9. The ball-worm transmission assembly according to claim 8, wherein the deflection boss has a circular cross section of slightly smaller radius than the spherical balls, and is adapted to pass along teeth of the gear without interference.

10. The ball-worm transmission assembly according to claim 8, wherein the at least one recirculation port also comprises a fillet that smoothens entry of the spherical balls into the oblique hole.

11. The ball-worm transmission assembly according to claim 8, wherein the peg part comprises a U shaped helical channel, and the oblique hole continues into the U shaped helical channel.

12. The ball-worm transmission assembly according to claim 11, wherein the worm part comprises bearing supports on which the worm is mounted in the ball worm transmission.

13. The ball-worm transmission assembly according to claim 6, wherein the worm part and the peg part are coupled by a fastener which sets a relative orientation of the worm part and the peg part.

14. The ball-worm transmission assembly according to claim 6, wherein:
a
wherein the peg part is positioned entirely within the worm part; and
wherein bearing supports for the worm are provided entirely on the worm part.

15. The ball-worm transmission assembly according to claim 6, further comprising:
   at least one recirculation port built into the worm part of the worm; and
   a path deflection boss protruding from the at least one recirculation port for forcing the spherical balls to enter the recirculation path;
   wherein the deflection boss has a substantially circular cross section of slightly smaller radius than the spherical balls, and is adapted to pass along teeth of the gear without interference.

16. The ball-worm transmission assembly according to claim 15, wherein the at least one recirculation port also comprises a fillet that smoothens transition of the spherical balls into the recirculation path.

17. The ball-worm transmission assembly according to claim 1, wherein the gap defined between the teeth of the gear has
   a double profile defined by: (i) a circular profile having a diameter substantially corresponding to a diameter of the spherical balls and a center substantially corresponding to a center of the spherical balls, so that the spherical balls contact the gap at respective side portions of the gap, and (ii) a second concave profile disposed at a bottom of the gap, so that a gap portion is formed at the bottom of the gap and the spherical balls do not contact the bottom of the gap.

18. The ball-worm transmission assembly according to claim 1, further comprising an outer race having an internal revolute cylindrical surface for maintaining contact of the balls on the worm.

19. The ball-worm transmission assembly according to claim 1, wherein the worm comprises a plurality of teeth and a gap defined between the teeth of the gear has a double profile defined by: (i) a circular profile having a diameter substantially corresponding to a diameter of the spherical balls and a center substantially corresponding to a center of the spherical balls, so that the spherical balls contact the gap at respective side portions of the gap, and (ii) a second concave profile disposed at a bottom of the gap, so that a gap portion is formed at the bottom of the gap and the spherical balls do not contact the bottom of the gap.

* * * * *